United States Patent
Sekine et al.

(10) Patent No.: US 8,941,772 B2
(45) Date of Patent: Jan. 27, 2015

(54) IMAGING LENS

(71) Applicant: Kantatsu Co., LTD., Yaita-shi, Tochigi (JP)

(72) Inventors: Yukio Sekine, Sukagawa (JP); Hisanori Suzuki, Sukagawa (JP)

(73) Assignee: Kantatsu Co., Ltd., Tochigi (JP)

( * ) Notice: Subject to any disclaimer, the term of this patent is extended or adjusted under 35 U.S.C. 154(b) by 0 days.

(21) Appl. No.: 13/937,260

(22) Filed: Jul. 9, 2013

(65) Prior Publication Data
US 2014/0036133 A1    Feb. 6, 2014

(30) Foreign Application Priority Data

Jul. 31, 2012 (JP) .................................. 2012-169974
Jun. 11, 2013 (JP) .................................. 2013-122383

(51) Int. Cl.
  *H04N 5/222*   (2006.01)
  *H04N 9/07*    (2006.01)
  *G02B 13/16*   (2006.01)
  *H04N 5/228*   (2006.01)
  *H04N 5/225*   (2006.01)
  *G02B 15/14*   (2006.01)
  *G02B 13/00*   (2006.01)

(52) U.S. Cl.
  CPC .............. *G02B 15/14* (2013.01); *G02B 13/004* (2013.01)
  USPC ...... 348/340; 348/360; 348/335; 348/208.11; 348/376

(58) Field of Classification Search
  None
  See application file for complete search history.

(56) References Cited

U.S. PATENT DOCUMENTS

| 7,826,149 B2 | 11/2010 | Tang et al. |
| 2012/0236421 A1 | 9/2012 | Tsai et al. |
| 2012/0327521 A1 | 12/2012 | Tsai et al. |
| 2013/0208171 A1* | 8/2013 | Lai ................................ 348/340 |

FOREIGN PATENT DOCUMENTS

JP           2004-341512 A     12/2004

* cited by examiner

*Primary Examiner* — Aung S Moe
*Assistant Examiner* — Euel Cowan
(74) *Attorney, Agent, or Firm* — Westerman, Hattori, Daniels & Adrian, LLP

(57) ABSTRACT

An imaging lens includes four lenses arranged in order from the object side to the image side: an aperture stop, positive (refractive power) first lens having a convex object-side surface near the optical axis, second lens having a positive meniscus shape near the axis, positive third lens having a convex image-side surface near the axis, and negative fourth lens having a concave image-side surface near the axis. All lens surfaces are aspheric. The image-side aspheric surface of the fourth lens has a pole-change point off the optical axis and conditional expressions (1) and (2) are satisfied:

$$0.75 < TLA/(2IH) < 0.90 \qquad (1)$$

$$0.90 < TLA/f < 1.30 \qquad (2)$$

where
TLA: distance on the optical axis from the first lens's object-side surface to the image sensor's image plane without a filter between the fourth lens and image sensor
IH: maximum image height
f: overall optical system focal length.

12 Claims, 22 Drawing Sheets

IMAGING LENS

The present application is based on and claims priority of Japanese patent applications No. 2012-169974 filed on Jul. 31, 2012, and No. 2013-122383 filed on Jun. 11, 2013, the entire contents of which are hereby incorporated by reference.

BACKGROUND OF THE INVENTION

1. Field of the Invention

The present invention relates to imaging lenses which form an image of an object on a CCD sensor or C-MOS sensor used in a compact image pickup device and more particularly to image pickup devices with an imaging lens which are mounted in mobile terminals such as mobile phones and smart phones which are becoming increasingly compact and thin, and PDAs.

2. Description of the Related Art

In recent years, personal digital assistants (PDAs) and smart phones as mobile phones with a computer function have become more popular than mobile phones mainly designed for calls. The imaging lenses which are mounted in these mobile terminals and smart phones are expected to be small and thin, have a small F-value and provide high resolution and a wide angle of view. Conventionally an imaging lens composed of four lenses has been known U.S. Pat. No. 7,826,149, B2 (Patent Document 1) and JP-A-2004-341512 (Patent Document 2). As the image sensor size is becoming smaller, the demand for a smaller and thinner imaging lens is growing. One indicator of the compactness of an imaging lens is the ratio of total track length to maximum image height. It may be thought that the smaller this ratio is, the smaller the lens system is in the optical axis direction. Patent Document 1 discloses an imaging lens including, in order from the object side, a first lens with positive refractive power having a convex object-side surface, an aperture stop, a second lens with negative refractive power as a double-sided aspheric lens, a third lens with positive refractive power as a double-sided aspheric meniscus lens having a concave object-side surface or a double-sided aspheric biconvex lens, and a fourth lens with negative refractive power as a double-sided aspheric biconcave lens, in which the image-side surface of the fourth lens has a pole-change point and the maximum ratio between the distance on the optical axis from the aperture stop to the image plane and the total track length is defined. In this imaging lens, in order to shorten the total track length, the refractive power of the first lens is increased and the object-side surface of the fourth lens is concave so that the image-side principal point in the optical system is away from the image plane. In the imaging lens described in Patent Document 1, the ratio of total track length (TTL) to maximum image height (IH) (TTL/(21H)) is about 0.9 and the ratio of total track length to focal length is about 1.2 to 1.3, so a relatively high compactness is achieved. However, the imaging lens disclosed in Patent Document 1 assumes that the image sensor size is ¼ inch or more and the total track length is about 4 mm. If the above refractive power and lens surface combination is used to achieve further compactness, it would be difficult for each constituent lens to have an adequate center thickness and an adequate edge thickness. When the constituent lenses are manufactured by injection molding, this would pose a problem that resin filling work may be difficult. It is structurally impossible to apply this imaging lens, for example, to a small image sensor of ⅕ inch or less while keeping the ratio of total track length to maximum image height low. Patent Document 2 discloses an imaging lens including, in order from the object side, a positive meniscus lens having a convex object-side surface as a first lens, an aperture diaphragm, a meniscus lens having a convex image-side surface as a second lens, a positive meniscus lens having a convex image-side surface as a third lens, and a negative lens as a fourth lens, in which at least one surface of the fourth lens is aspheric and the ratio of the power of the paraxial region of the fourth lens to its power at maximum light ray height and the difference between the third lens' Abbe number and the fourth lens' Abbe number are set within appropriate ranges respectively. In this imaging lens, the first lens is a meniscus lens whose object-side surface has a strong positive power and the image-side principal point of the first lens is nearer to the object and the image-side surface of the fourth lens is concave, so that the total track length is short. In the imaging lens described in Patent Document 2, the ratio of total track length to maximum image height (TTL/(21H)) is about 1.17 and the ratio of total track length to focal length is about 1.5, so sufficient compactness is not achieved. In addition, the half angle of view is about 33 degrees, so the angle of view is not sufficiently wide.

SUMMARY OF THE INVENTION

The present invention has been made in view of the problem of the conventional techniques and has an objective to provide an imaging lens which features compactness, a relatively wide angle of view and a small F-value and corrects aberrations properly. In particular, the invention provides a thin imaging lens which copes with the trend toward smaller sensor sizes.

According to an aspect of the present invention, there is provided an imaging lens for a solid-state image sensor in which lenses are arranged in order from the object side to the image side as follows: an aperture stop, a first lens with positive refractive power having a convex surface on the object side near an optical axis, a second lens having a positive meniscus shape near the optical axis, a third lens with positive refractive power having a convex surface on the image side near the optical axis, and a fourth lens with negative refractive power having a concave surface on the image side near the optical axis. Both the surfaces of each lens are aspheric and the image-side aspheric surface of the fourth lens has a pole-change point in a position off the optical axis and conditional expressions (1) and (2) below are satisfied:

$$0.75 < TLA/(2IH) < 0.90 \tag{1}$$

$$0.90 < TLA/f < 1.30 \tag{2}$$

where

TLA: distance on the optical axis from the object-side surface of the first lens to the image plane of the image sensor when a filter between the fourth lens and the image sensor is removed IH: maximum image height f: focal length of the overall optical system of the imaging lens.

"Pole-change point" here means a point on an aspheric surface where a tangential plane crosses the optical axis perpendicularly. Since the first, second, and third lenses in the imaging lens according to the present invention have positive power, the inter-lens distance can be shortened to decrease the total track length.

Also, since the fourth lens has negative power near the optical axis, an adequate back focus is ensured. Also all the lens surfaces have an adequate aspheric shape so that various aberrations can be corrected properly. The image-side surface of the fourth lens is concave near the optical axis and has a pole-change point in a position off the optical axis. Consequently, field curvatures can be corrected properly and the angle of light rays incident on the image sensor can be restrained adequately.

The aperture stop is located on the object side of the first lens. Since the aperture stop is nearest to the object in the lens system, the exit pupil is away from the image plane and the angle of light rays incident on the image sensor can be easily restrained and a good telecentricity can be obtained on the image side.

The conditional expression (1) defines an appropriate range of the ratio of total track length to maximum image height. If the ratio is above the upper limit in the conditional expression (1), the total track length would be long relative to the maximum image height and due to the increased freedom in the shape of each lens it would be easier to improve the performance, but it would be disadvantageous in shortening the total track length. On the other hand, if the ratio is below the lower limit in the conditional expression (1), the total track length would be too short relative to the maximum image height and it would be difficult for the constituent lenses to have a manufacturable thickness and due to the decreased freedom in the shape of each lens including an aspheric shape, it would be difficult to make a lens configuration to correct various aberrations properly.

The conditional expression (2) defines an appropriate range of the ratio of total track length to the focal length of the overall optical system of the imaging lens. If the ratio is above the upper limit in the conditional expression (2), it would be disadvantageous in shortening the total track length. On the other hand, if the ratio is below the lower limit in the conditional expression (2) and the total track length is too short relative to the focal length of the overall optical system, the image-side principal point of the imaging lens would be too near to the object, so it would be difficult to ensure a manufacturable lens thickness and due to the decreased freedom in the shape of each lens including an aspheric shape and lens power imbalance, it would be difficult to correct various aberrations properly.

Preferably the imaging lens according to the present invention satisfies a conditional expression (3) below:

$$0.4 < f1/f3 < 5.5 \quad (3)$$

where
f1: focal length of the first lens
f3: focal length of the third lens.

The conditional expression (3) defines an appropriate range of the ratio of the focal length of the first lens to the focal length of the third lens. It is a condition to ensure an adequate back focus and correct distortion and coma aberration properly. If the ratio is above the upper limit in the conditional expression (3), the positive power of the first lens would be relatively weak, making it difficult to ensure an adequate back focus and bringing a disadvantage in shortening the total track length. On the other hand, if the ratio is below the lower limit in the conditional expression (3), the positive power of the first lens would be relatively strong, which would offer an advantage in shortening the total track length but make correction of distortion and coma aberration difficult.

Preferably the constituent lenses of the imaging lens according to the present invention are made of plastic material and as for Abbe number, they satisfy conditional expressions (4) and (5) below:

$$50 \leq vd \leq 70 \quad (4)$$

$$vd1 = vd2 = vd3 = vd4 \quad (5)$$

where
vd: Abbe number of the first lens to the fourth lens
vd1: Abbe number of the first lens
vd2: Abbe number of the second lens
vd3: Abbe number of the third lens
vd4: Abbe number of the fourth lens.

The lens material used in the present invention is a low-dispersion plastic material and all the lenses are made of the same material, which is advantageous in ensuring high formability and reducing cost.

Preferably the imaging lens according to the present invention satisfies a conditional expression (6) below:

$$-20.0 < (r1+r2)/(r1-r2) < -0.50 \quad (6)$$

where
r1: curvature radius of the object-side surface of the first lens
r2: curvature radius of the image-side surface of the first lens.

If the ratio is above the upper limit in the conditional expression (6), the object-side surface and image-side surface of the first lens would be nearly symmetrical to each other in terms of shape and chromatic aberration would tend to worsen. Also, the image-side principal point of the first lens would be nearer to the image plane, bringing a disadvantage in shortening the total track length. On the other hand, if the ratio is below the lower limit in the conditional expression (6), the image-side principal point of the first lens would be nearer to the object, offering an advantage in shortening the total track length; however, undesirably the curvature radius of the object-side surface of the first lens or the curvature radius of the image-side surface of the first lens would be too small, resulting in a high manufacturing error sensitivity.

Preferably the imaging lens according to the present invention satisfies a conditional expression (7) below:

$$1.00 < f123/|f4| < 1.20 \quad (7)$$

where
f123: composite focal length of the first, second, and third lenses
f4: focal length of the fourth lens.

The conditional expression (7) defines an appropriate range of the composite focal length of the first, second, and third lenses to the focal length of the fourth lens. By satisfying the conditional expression (7), an adequate back focus is ensured, the total track length is shortened and distortion and chromatic aberration can be corrected properly. If the upper limit or lower limit in the conditional expression (7) is exceeded, distortion and chromatic aberration would increase.

It is preferable that the imaging lens according to the present invention be used for an image pickup device having an image sensor of ⅕ inch or less whose number of pixels is 5 megapixels or less.

If the image sensor size is ⅕ inch, the diagonal line of its image plane is about 3.5 mm, and if the image sensor size is ⅐ inch, the diagonal line is about 2.46 mm. For the imaging lens to satisfy the conditional expression (1), the total track length should be very short at about 2.80 mm in the case of ⅕ inch or about 1.97 mm in the case of ⅐ inch. The present invention optimizes the lens power arrangement and the combination of lens shapes and positions so that the four constituent lenses can be built in a very small space.

Generally a technique for a finished lens system, called scaling, is well known which enlarges and reduces the lens system without changing the refraction index and/or Abbe number. It is known that when a new smaller lens system is created by multiplying a parameter by a given coefficient, spherical aberration, astigmatism, and coma aberration are decreased. However, a smaller lens system may not be created simply by the scaling technique. If a too small lens system is designed, some problems would arise, such as the problem that the thickness of each lens or the air distance cannot be sufficient and the problem that the installation space for a light shielding plate for prevention of ghost or flare is not available. The present invention realizes a lens system in which the total track length is very short as mentioned above and the thickness of each lens and the air distance and the installation space for a light shielding plate can be sufficient from the viewpoint of manufacturability and also various aberrations (spherical aberration, astigmatism, and coma aberration) can be decreased in the same way as in the scaling technique.

Preferably, in the imaging lens according to the present invention, a diffractive optical surface is provided on at least one of the surfaces from the object-side surface of the first lens to the image-side surface of the second lens. The diffractive optical surface corrects chromatic aberration by inversion of the wavelength-dependence of refraction index of emitted light. Since the presence of the diffractive optical surface makes it possible to correct axial chromatic aberration and chromatic aberration of magnification properly without the need for an additional lens, an imaging lens which corrects axial chromatic aberration and chromatic aberration of magnification properly regardless of the image sensor size can be realized.

DETAILED DESCRIPTION OF THE PREFERRED EMBODIMENTS

The present invention presents two embodiments. A first embodiment is an imaging lens including three lenses with positive refractive power and one lens with negative refractive power which are arranged in order from the object side to the image side. A second embodiment is an imaging lens including three lenses with positive refractive power and one lens with negative refractive power which are arranged in order from the object side to the image side like the first embodiment, in which a diffractive optical surface is provided on at least one of the lens surfaces from the object-side surface of the first lens to the image-side surface of the second lens.

First Embodiment

A first embodiment of the present invention will be described in detail referring to drawings. FIGS. 1, 3, 5, 7, 9, 11, 13, and 15 are sectional views of the imaging lenses as Examples 1 to 8 according to the first embodiment respectively.

In all the examples according to the first embodiment, an aperture stop ST is located in the effective diameter peripheral area of the object-side surface r1 of the first lens L1. A filter IR which includes surfaces r9 and r10 is located between the image-side surface r8 of the fourth lens L4 and the image plane IM. In the figures, X represents an optical axis. In calculation of a distance on the optical axis, the filter IR (r9 and r10) is removed.

In the first embodiment, all the lens surfaces are aspheric. The aspheric shape of each of these lens surfaces is expressed by Equation 1, where Z represents the optical axis direction, H represents height in a direction perpendicular to the optical axis, k represents conic constant, and A2$i$ represents aspheric coefficient.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, the imaging lenses as examples according to the first embodiment will be illustrated. In each example, f represents focal length of the overall optical system of the imaging lens, Fno represents F-number, and ω represents half-angle of view. i represents a surface number counted from the object side, r represents curvature radius, d represents distance between lens surfaces on the optical axis (inter-surface distance), Nd represents refractive index with respect to d-ray (reference wavelength), νd represents Abbe number with respect to d-ray, and IH represents maximum image height of the image plane. As for aspheric surfaces, an asterisk (*) after surface number i indicates an aspheric surface.

Example 1

Figure 1:
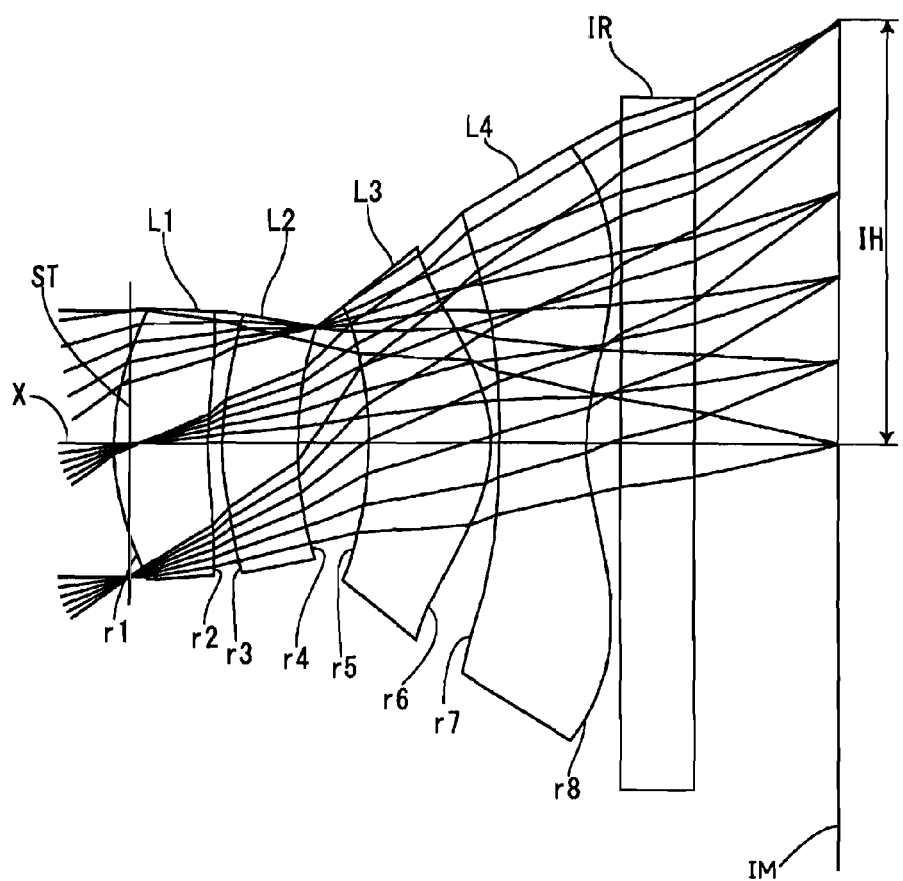
FIG. 1 is a sectional view of an imaging lens as Example 1 according to a first embodiment of the invention.

As shown in FIG. 1, in the imaging lens as Example 1, the first lens L1 is a meniscus lens with positive refractive power having a convex surface on the object side near the optical axis X, the second lens L2 is a meniscus lens with positive refractive power having a convex surface on the object side near the optical axis X, the third lens L3 is a meniscus lens with positive refractive power having a convex surface on the image side near the optical axis X, and the fourth lens L4 is a lens with negative refractive power having a biconcave shape near the optical axis X. The image-side aspheric surface r8 of the fourth lens L4 has a pole-change point in a position off the optical axis X. All the lenses are made of the same plastic material.

The basic lens data of Example 1 is shown in Table 1.

TABLE 1

Embodiment 1

Unit mm

| f = | 1.710 |
| Fno = | 2.20 |
| ω(°) = | 39.75 |
| IH = | 1.234 |

Surface Data

| Surface No. i | Curvature Radius r | Surface Distance d | Refractive Index Nd | Abbe Number νd |
|---|---|---|---|---|
| (Object Surface) | Infinity | Infinity | | |
| (Stop) | Infinity | −0.045 | | |
| 1* | 0.764 | 0.271 | 1.5346 | 56.16 |
| 2* | 1.250 | 0.041 | | |
| 3* | 0.846 | 0.220 | 1.5346 | 56.16 |
| 4* | 1.227 | 0.207 | | |
| 5* | −1.186 | 0.360 | 1.5346 | 56.16 |
| 6* | −0.411 | 0.024 | | |
| 7* | −7.197 | 0.253 | 1.5346 | 56.16 |
| 8* | 0.539 | 0.150 | | |
| 9 | Infinity | 0.210 | 1.5168 | 64.20 |
| 10 | Infinity | 0.363 | | |
| Image Plane | Infinity | | | |

Constituent Lens Data

| Lens | Start Surface | Focal Length |
|---|---|---|
| 1 | 1 | 3.080 |
| 2 | 3 | 4.235 |
| 3 | 5 | 1.012 |
| 4 | 7 | −0.928 |

Aspherical Surface Data

| | 1st Surface | 2nd Surface | 3rd Surface | 4th Surface |
|---|---|---|---|---|
| k | −2.510E+00 | −7.693E+00 | −2.765E+00 | 7.437E+00 |
| A4 | 3.469E−01 | −1.703E+00 | −1.128E+00 | 2.508E−01 |
| A6 | −7.654E−02 | −6.004E+00 | −8.135E+00 | −7.589E+00 |
| A8 | −1.204E+01 | 5.443E+01 | 6.011E+01 | 5.089E+01 |
| A10 | 2.393E+01 | −5.180E+01 | 5.212E+01 | 6.207E+01 |
| A12 | 0.000E+00 | 0.000E+00 | 0.000E+00 | −1.186E+02 |
| A14 | 0.000E+00 | 0.000E+00 | 0.000E+00 | 0.000E+00 |
| A16 | 0.000E+00 | 0.000E+00 | 0.000E+00 | 0.000E+00 |

TABLE 1-continued

Embodiment 1

| | 5th Surface | 6th Surface | 7th Surface | 8th Surface |
|---|---|---|---|---|
| k | −1.580E+01 | −4.259E+00 | 0.000E+00 | −9.846E+00 |
| A4 | −6.209E−01 | −1.455E+00 | −1.316E+00 | −1.132E+00 |
| A6 | −3.436E+00 | 7.478E+00 | 2.848E+00 | 2.628E+00 |
| A8 | 8.237E+01 | −1.419E+01 | −1.867E+00 | −5.514E+00 |
| A10 | −8.609E+02 | 1.004E+01 | 3.777E−01 | 7.834E+00 |
| A12 | 4.153E+03 | 9.421E+01 | −2.825E−01 | −7.027E+00 |
| A14 | −1.198E+04 | −3.905E+02 | 4.705E−01 | 3.239E+00 |
| A16 | 1.264E+04 | 4.479E+02 | −4.345E−01 | −4.689E−01 |

The values of the conditional expressions are shown below:

$$TLA/(2IH)=0.82 \tag{1}$$

$$TLA/f=1.18 \tag{2}$$

$$f1/f3=3.043 \tag{3}$$

$$\nu d=56.16 \tag{4}$$

$$\nu d1=\nu d2=\nu d3=\nu d4 \tag{5}$$

$$(r1+r2)/(r1-r2)=-4.15 \tag{6}$$

$$f123/|f4|=1.08 \tag{7}$$

As shown above, the imaging lens as Example 1 satisfies the conditional expressions (1) to (7). In this example, since the total track length is 2.03 mm, compactness is achieved.

Figure 2:
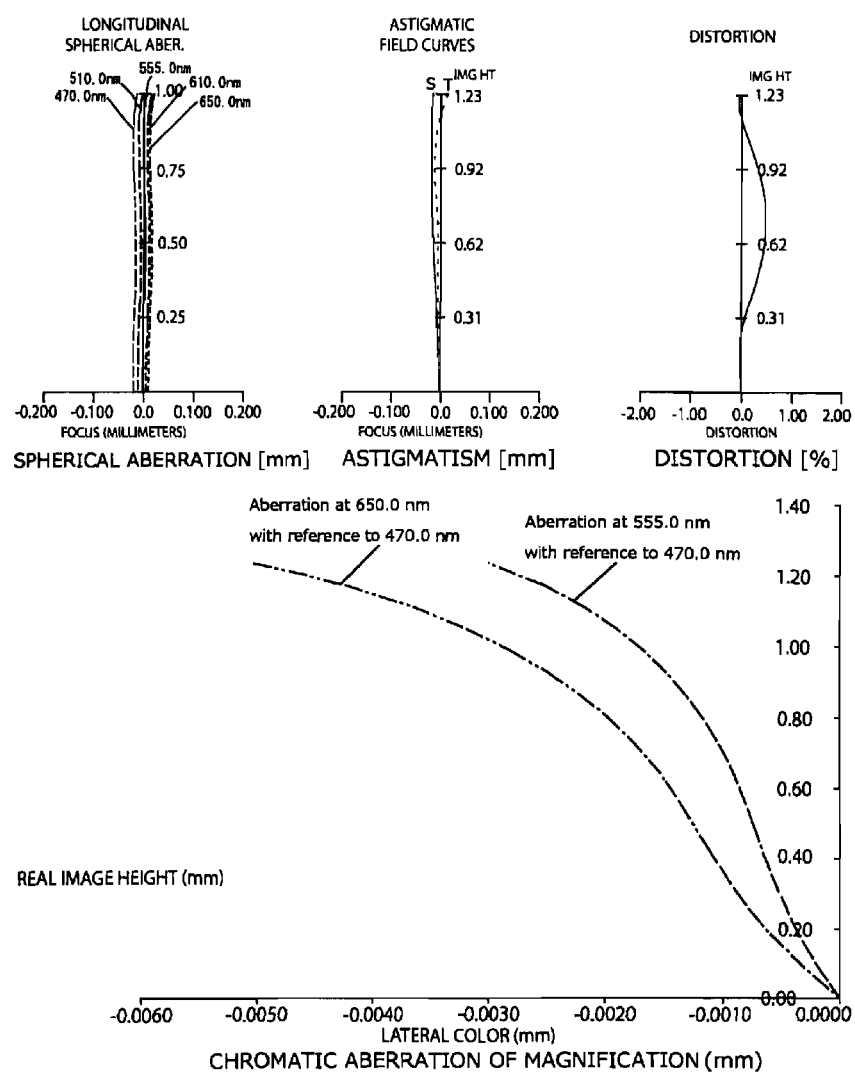
FIG. 2 shows various aberrations of the imaging lens as Example 1 according to the first embodiment.

FIG. 2 shows spherical aberration (mm), astigmatism (mm), distortion (%) and chromatic aberration of magnification (mm) for the imaging lens as Example 1. Among these diagrams, the spherical aberration diagram shows the amount of aberration at wavelengths of 470.0 nm, 510.0 nm, 555.0 nm, 610.0 nm, and 650.0 nm, the astigmatism diagram shows the amount of aberration on sagittal image surface S and the amount of aberration on tangential image surface T, and the diagram of chromatic aberration of magnification shows the amount of aberration at 555.0 nm with respect to reference waveform 470.0 nm and the amount of aberration at 650.0 nm with respect to 470.0 nm (the same is true for FIGS. 2, 4, 6, 8, 10, 12, 14, and 16).

As shown in FIG. 2, the imaging lens as Example 1 corrects various aberrations properly.

Example 2

Figure 3:
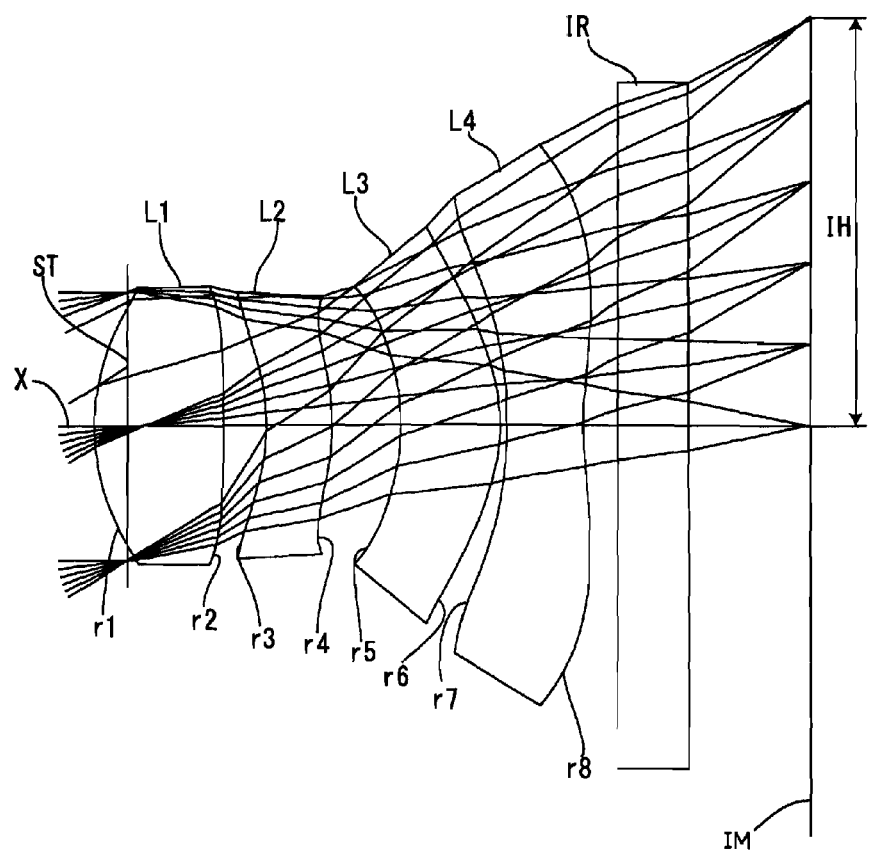
FIG. 3 is a sectional view of an imaging lens as Example 2 according to the first embodiment of the invention.

As shown in FIG. 3, in the imaging lens as Example 2, the first lens L1 is a lens with positive refractive power having a biconvex shape near the optical axis X, the second lens L2 is a meniscus lens with positive refractive power having a convex surface on the image side near the optical axis X, the third lens L3 is a meniscus lens with positive refractive power having a convex surface on the image side near the optical axis X, and the fourth lens L4 is a lens with negative refractive power having a biconcave shape near the optical axis X. The image-side aspheric surface r8 of the fourth lens L4 has a pole-change point in a position off the optical axis X. All the lenses are made of the same plastic material.

The basic lens data of Example 2 is shown in Table 2.

TABLE 2

Embodiment 2

Unit mm

| | | |
|---|---|---|
| f = | | 1.970 |
| Fno = | | 2.45 |
| ω(°) = | | 35.64 |
| IH = | | 1.234 |

Surface Data

| Surface No. i | Curvature Radius r | Surface Distance d | Refractive Index Nd | Abbe Number vd |
|---|---|---|---|---|
| (Object Surface) | Infinity | Infinity | | |
| (Stop) | Infinity | −0.100 | | |
| 1* | 0.660 | 0.387 | 1.5346 | 56.16 |
| 2* | −12.276 | 0.131 | | |
| 3* | −0.606 | 0.200 | 1.5346 | 56.16 |
| 4* | −0.671 | 0.208 | | |
| 5* | −0.652 | 0.301 | 1.5346 | 56.16 |
| 6* | −0.507 | 0.020 | | |
| 7* | −1.513 | 0.230 | 1.5346 | 56.16 |
| 8* | 1.069 | 0.150 | | |
| 9 | Infinity | 0.210 | 1.5168 | 64.20 |
| 10 | Infinity | 0.314 | | |
| Image Plane | Infinity | | | |

Constituent Lens Data

| Lens | Start Surface | Focal Length |
|---|---|---|
| 1 | 1 | 1.184 |
| 2 | 3 | 139.757 |
| 3 | 5 | 2.470 |
| 4 | 7 | −1.136 |

Aspherical Surface Data

| | 1st Surface | 2nd Surface | 3rd Surface | 4th Surface |
|---|---|---|---|---|
| k | −1.216E+00 | 9.775E+01 | −3.540E+00 | −2.112E+00 |
| A4 | 4.394E−01 | −5.453E−01 | −2.195E−01 | 1.983E+00 |
| A6 | −2.279E+00 | −5.050E+00 | 1.004E+01 | 1.231E+01 |
| A8 | 1.897E+01 | 2.476E+01 | −2.471E+01 | −8.192E+00 |
| A10 | −9.070E+01 | −6.995E+01 | 1.817E+01 | 3.692E+02 |
| A12 | 0.000E+00 | 0.000E+00 | 0.000E+00 | −1.235E+02 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | −4.442E+00 | −5.783E+00 | 0.000E+00 | −3.680E+00 |
| A4 | 6.089E−01 | −6.457E−01 | −9.239E−01 | −1.231E+00 |
| A6 | −1.475E+01 | 3.218E+00 | 2.779E+00 | 3.329E+00 |
| A8 | 9.140E+01 | −1.830E+01 | −1.415E+00 | −6.766E+00 |
| A10 | −8.276E+02 | 2.566E+01 | 2.575E−01 | 8.582E+00 |
| A12 | 4.592E+03 | 1.368E+02 | −1.365E+00 | −6.919E+00 |
| A14 | −1.369E+04 | −4.383E+02 | −1.324E+00 | 2.600E+00 |
| A16 | 1.343E+04 | 3.384E+02 | 2.938E+00 | 1.489E−01 |

The values of the conditional expressions are shown below:

$$TLA/(2IH)=0.84 \quad (1)$$

$$TLA/f=1.06 \quad (2)$$

$$f1/f3=0.479 \quad (3)$$

$$vd=56.16 \quad (4)$$

$$vd1=vd2=vd3=vd4 \quad (5)$$

$$(r1+r2)/(r1-r2)=-0.90 \quad (6)$$

$$|f123/f4|=1.09 \quad (7)$$

As shown above, the imaging lens as Example 2 satisfies the conditional expressions (1) to (7). In this example, since the total track length is 2.08 mm, compactness is achieved.

Figure 4:
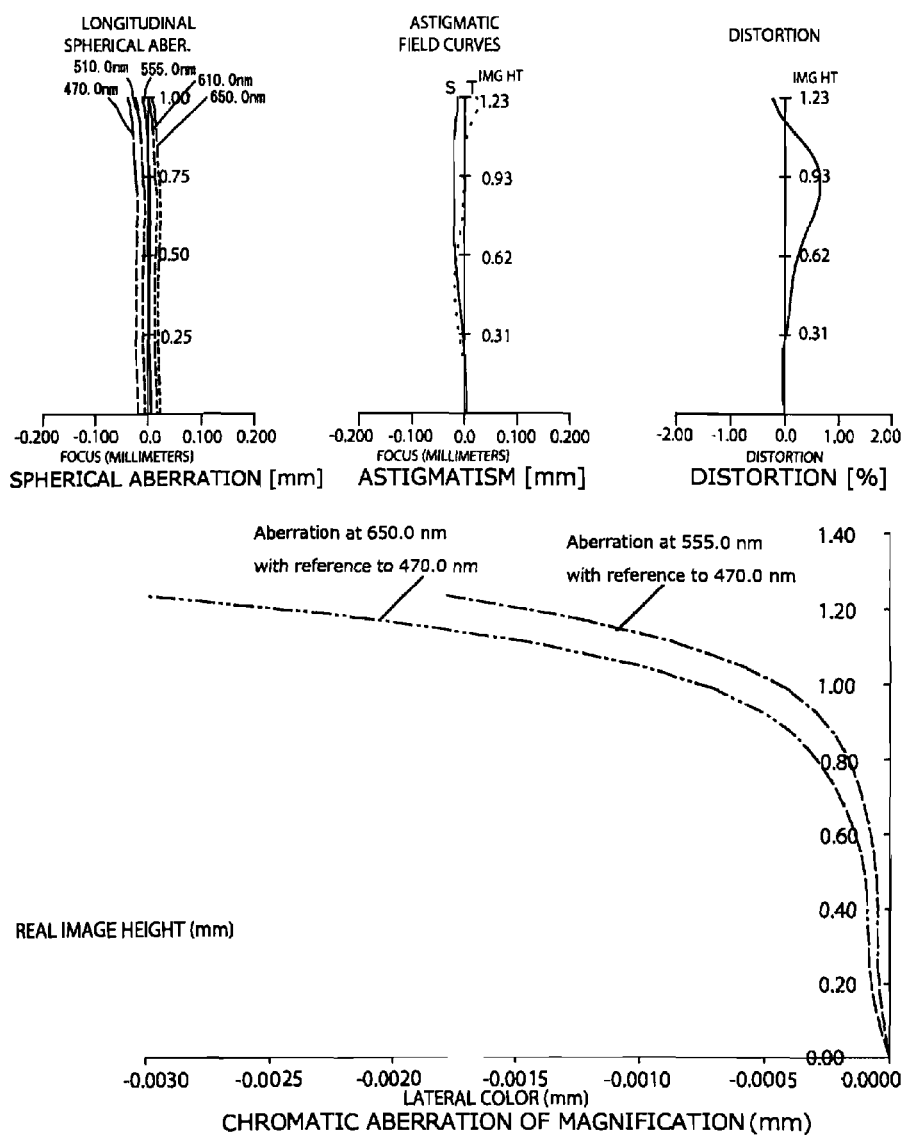
FIG. 4 shows various aberrations of the imaging lens as Example 2 according to the first embodiment of the invention.

FIG. 4 shows spherical aberration (mm), astigmatism (mm), distortion (%) and chromatic aberration of magnification (mm) for the imaging lens as Example 2.

As shown in FIG. 4, the imaging lens as Example 2 corrects various aberrations properly.

Example 3

Figure 5:
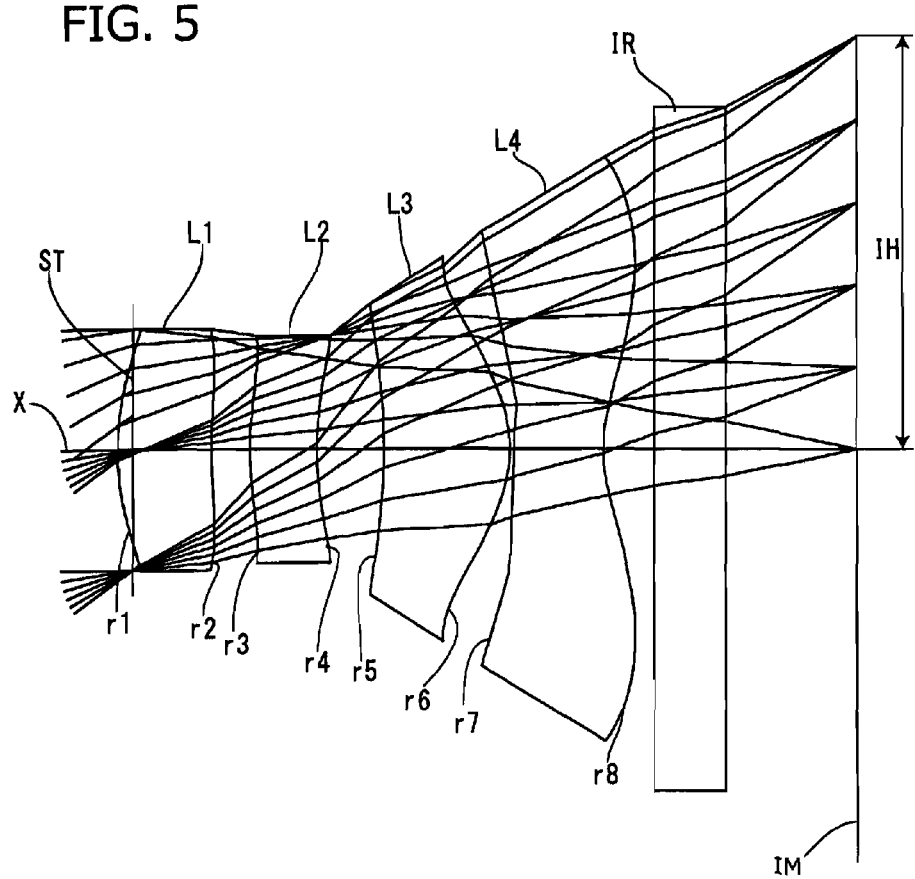
FIG. 5 is a sectional view of an imaging lens as Example 3 according to the first embodiment of the invention.

As shown in FIG. 5, in the imaging lens as Example 3, the first lens L1 is a meniscus lens with positive refractive power having a convex surface on the object side near the optical axis X, the second lens L2 is a meniscus lens with positive refractive power having a convex surface on the object side near the optical axis X, the third lens L3 is a meniscus lens with positive refractive power having a convex surface on the image side near the optical axis X, and the fourth lens L4 is a meniscus lens with negative refractive power having a concave surface on the image side near the optical axis X. The image-side aspheric surface r8 of the fourth lens L4 has a pole-change point in a position off the optical axis X. All the lenses are made of the same plastic material.

The basic lens data of Example 3 is shown in Table 3.

TABLE 3

Embodiment 3
Unit mm

| | | |
|---|---|---|
| f = | | 1.740 |
| Fno = | | 2.41 |
| ω(°) = | | 39.32 |
| IH = | | 1.234 |

Surface Data

| Surface No. i | Curvature Radius r | Surface Distance d | Refractive Index Nd | Abbe Number vd |
|---|---|---|---|---|
| (Object Surface) | Infinity | Infinity | | |
| (Stop) | Infinity | −0.045 | | |
| 1* | 0.860 | 0.280 | 1.5346 | 56.16 |
| 2 | 2.211 | 0.115 | | |
| 3* | 1.098 | 0.200 | 1.5346 | 56.16 |
| 4* | 1.098 | 0.202 | | |
| 5* | −1.502 | 0.378 | 1.5346 | 56.16 |
| 6* | −0.391 | 0.020 | | |
| 7* | 104.897 | 0.261 | 1.5346 | 56.16 |
| 8* | 0.452 | 0.120 | | |
| 9 | Infinity | 0.210 | 1.5168 | 64.20 |
| 10 | Infinity | 0.415 | | |
| Image Plane | Infinity | | | |

Constituent Lens Data

| Lens | Start Surface | Focal Length |
|---|---|---|
| 1 | 1 | 2.456 |
| 2 | 3 | 32.322 |
| 3 | 5 | 0.884 |
| 4 | 7 | −0.851 |

Aspherical Surface Data

| | 1st Surface | 2nd Surface | 3rd Surface | 4th Surface |
|---|---|---|---|---|
| k | −3.025E+00 | −3.695E+01 | −1.104E+01 | 1.544E+00 |
| A4 | 2.177E−01 | −1.379E+00 | −1.121E+00 | −4.286E−01 |
| A6 | −8.872E−01 | −2.551E+00 | −9.762E+00 | −8.324E+00 |
| A8 | −7.061E+00 | −4.310E+00 | −2.261E+00 | 9.874E+00 |

TABLE 3-continued

Embodiment 3
Unit mm

|     |            |            |            |            |
| --- | ---------- | ---------- | ---------- | ---------- |
| A10 | −1.026E+01 | 5.293E+01  | 2.446E+02  | 1.156E+02  |
| A12 | 0.000E+00  | 0.000E+00  | 0.000E+00  | −1.186E+02 |
| A14 | 0.000E+00  | 0.000E+00  | 0.000E+00  | 0.000E+00  |
| A16 | 0.000E+00  | 0.000E+00  | 0.000E+00  | 0.000E+00  |

|     | 5th Surface | 6th Surface | 7th Surface | 8th Surface |
| --- | ----------- | ----------- | ----------- | ----------- |
| k   | −2.562E+01  | −3.943E+00  | 0.000E+00   | −7.364E+00  |
| A4  | 9.979E−02   | −1.293E+00  | −1.600E+00  | −1.251E+00  |
| A6  | −2.732E+00  | 6.545E+00   | 2.889E+00   | 3.134E+00   |
| A8  | 7.564E+01   | −1.379E+01  | −1.195E+00  | −6.197E+00  |
| A10 | −8.263E+02  | 2.042E+01   | 8.953E−01   | 8.038E+00   |
| A12 | 4.400E+03   | 1.122E+02   | −1.774E+00  | −6.680E+00  |
| A14 | −1.162E+04  | −4.084E+02  | −2.413E+00  | 3.234E+00   |
| A16 | 1.264E+04   | 3.131E+02   | 3.475E+00   | −7.514E−01  |

The values of the conditional expressions are shown below:

$$TLA/(2IH)=0.86 \quad (1)$$

$$TLA/f=1.22 \quad (2)$$

$$f1/f3=2.778 \quad (3)$$

$$vd=56.16 \quad (4)$$

$$vd1=vd2=vd3=vd4 \quad (5)$$

$$(r1+r2)/(r1-r2)=-2.27 \quad (6)$$

$$f123/|f4|=1.14 \quad (7)$$

As shown above, the imaging lens as Example 3 satisfies the conditional expressions (1) to (7). In this example, since the total track length is 2.13 mm, compactness is achieved.

Figure 6:
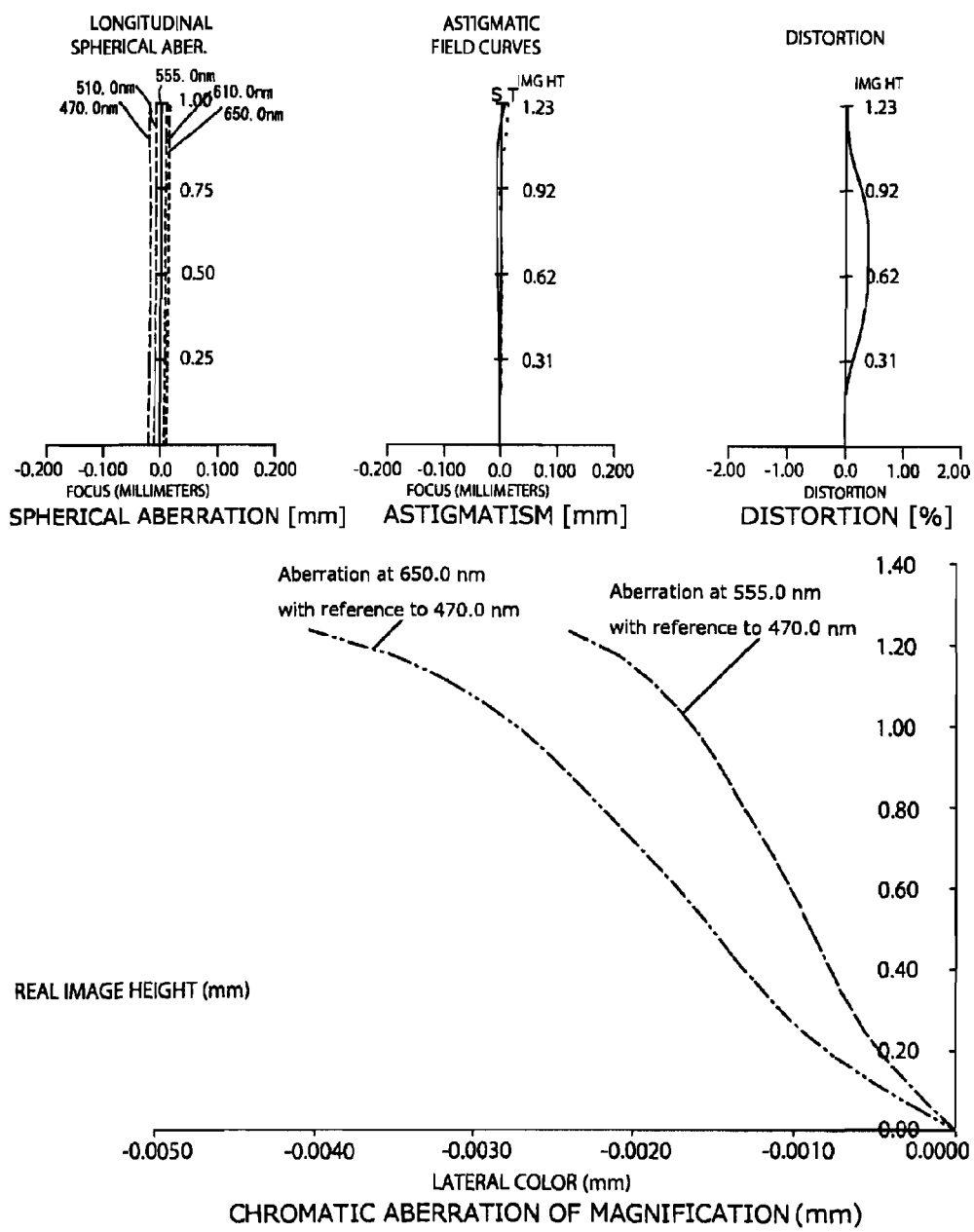
FIG. 6 shows various aberrations of the imaging lens as Example 3 according to the first embodiment of the invention.

FIG. 6 shows spherical aberration (mm), astigmatism (mm), distortion (%) and chromatic aberration of magnification (mm) for the imaging lens as Example 3.

As shown in FIG. 6, the imaging lens as Example 3 corrects various aberrations properly.

Example 4

Figure 7:
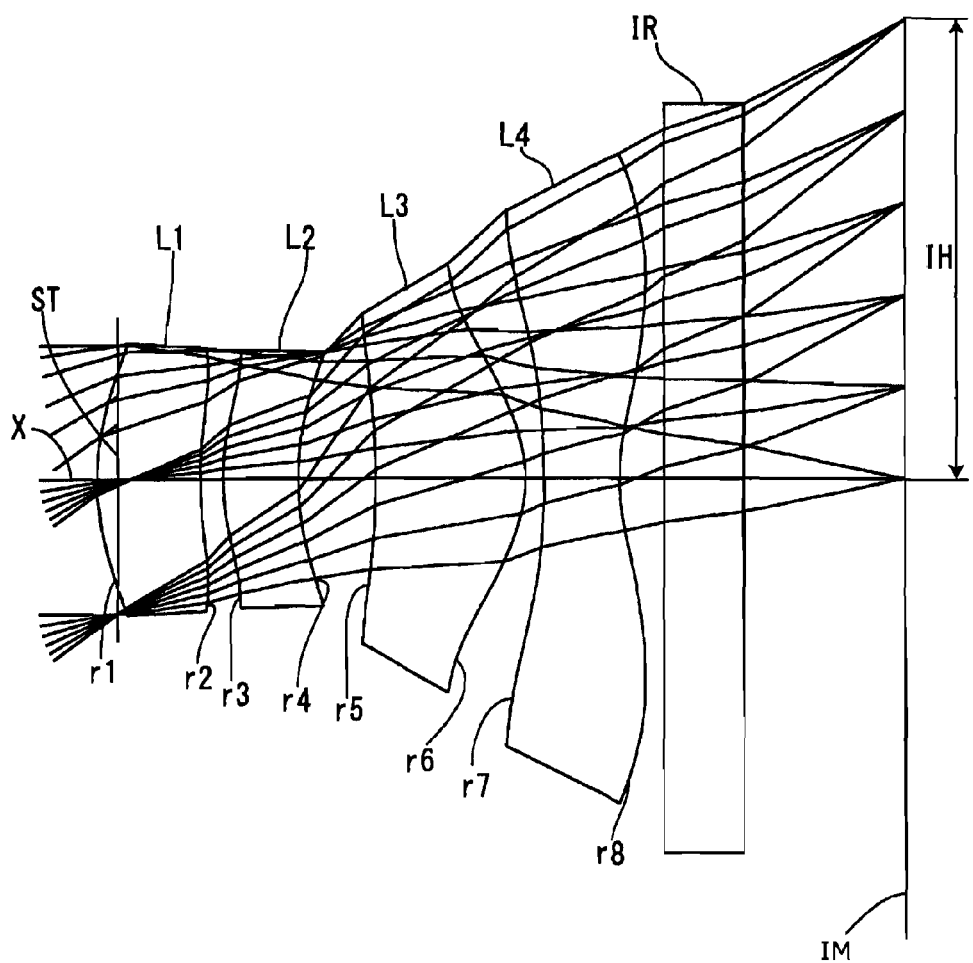
FIG. 7 is a sectional view of an imaging lens as Example 4 according to the first embodiment of the invention.

As shown in FIG. 7, in the imaging lens as Example 4, the first lens L1 is a meniscus lens with positive refractive power having a convex surface on the object side near the optical axis X, the second lens L2 is a meniscus lens with positive refractive power having a convex surface on the object side near the optical axis X, the third lens L3 is a meniscus lens with positive refractive power having a convex surface on the image side near the optical axis X and the fourth lens L4 is a lens with negative refractive power having a biconcave shape near the optical axis X. The image-side aspheric surface r8 of the fourth lens L4 has a pole-change point in a position off the optical axis X. All the lenses are made of the same plastic material.

The basic lens data of Example 4 is shown in Table 4.

TABLE 4

Embodiment 4
Unit mm

| f =    | 1.730 |
| ------ | ----- |
| Fno =  | 2.40  |
| ω(°) = | 39.50 |
| IH =   | 1.234 |

TABLE 4-continued

Embodiment 4
Unit mm

Surface Data

| Surface No. i   | Curvature Radius r | Surface Distance d | Refractive Index Nd | Abbe Number vd |
| --------------- | ------------------ | ------------------ | ------------------- | -------------- |
| (Object Surface)| Infinity           | Infinity           |                     |                |
| (Stop)          | Infinity           | −0.055             |                     |                |
| 1*              | 0.770              | 0.274              | 1.5346              | 56.16          |
| 2*              | 1.007              | 0.060              |                     |                |
| 3*              | 0.630              | 0.200              | 1.5346              | 56.16          |
| 4*              | 0.776              | 0.209              |                     |                |
| 5*              | −1.903             | 0.403              | 1.5346              | 56.16          |
| 6*              | −0.382             | 0.050              |                     |                |
| 7*              | −2.225             | 0.202              | 1.5346              | 56.16          |
| 8*              | 0.563              | 0.200              |                     |                |
| 9               | Infinity           | 0.210              | 1.5168              | 64.20          |
| 10              | Infinity           | 0.340              |                     |                |
| Image Plane     | Infinity           |                    |                     |                |

Constituent Lens Data

| Lens | Start Surface | Focal Length |
| ---- | ------------- | ------------ |
| 1    | 1             | 4.360        |
| 2    | 3             | 4.237        |
| 3    | 5             | 0.817        |
| 4    | 7             | −0.820       |

Aspherical Surface Data

|     | 1st Surface | 2nd Surface | 3rd Surface | 4th Surface |
| --- | ----------- | ----------- | ----------- | ----------- |
| k   | −2.865E+00  | −1.255E+01  | −7.240E+00  | 1.142E+00   |
| A4  | 3.677E−01   | −1.991E+00  | 1.582E−02   | −2.896E−02  |
| A6  | 5.950E−01   | −5.300E−01  | −2.046E+01  | −1.160E+01  |
| A8  | −1.334E+01  | −1.004E+01  | 3.456E+01   | 1.043E+01   |
| A10 | 1.106E+01   | 1.022E+02   | 2.474E+02   | 1.654E+02   |
| A12 | 0.000E+00   | 0.000E+00   | 0.000E+00   | −1.186E+02  |
| A14 | 0.000E+00   | 0.000E+00   | 0.000E+00   | 0.000E+00   |
| A16 | 0.000E+00   | 0.000E+00   | 0.000E+00   | 0.000E+00   |

|     | 5th Surface | 6th Surface | 7th Surface | 8th Surface |
| --- | ----------- | ----------- | ----------- | ----------- |
| k   | −1.115E+00  | −3.492E+00  | 0.000E+00   | −1.020E+01  |
| A4  | 1.116E−01   | −9.936E−01  | −6.206E−01  | −1.256E+00  |
| A6  | 7.157E−01   | 5.246E+00   | 2.127E+00   | 3.515E+00   |
| A8  | 6.487E+01   | −6.242E+00  | −1.478E+00  | −7.262E+00  |
| A10 | −7.832E+02  | 1.896E+01   | 4.977E−01   | 9.197E+00   |
| A12 | 4.096E+03   | 5.085E+01   | −1.136E+00  | −6.738E+00  |
| A14 | −1.098E+04  | −4.881E+02  | −8.483E−01  | 2.719E+00   |
| A16 | 1.264E+04   | 6.696E+02   | 1.799E+00   | −5.430E−01  |

The values of the conditional expressions are shown below:

$$TLA/(2IH)=0.84 \quad (1)$$

$$TLA/f=1.20 \quad (2)$$

$$f1/f3=5.337 \quad (3)$$

$$vd=56.16 \quad (4)$$

$$vd1=vd2=vd3=vd4 \quad (5)$$

$$(r1+r2)/(r1-r2)=-7.49 \quad (6)$$

$$f123/|f4|=1.14 \quad (7)$$

As shown above, the imaging lens as Example 4 satisfies the conditional expressions (1) to (7). In this example, since the total track length is 2.08 mm, compactness is achieved.

Figure 8:
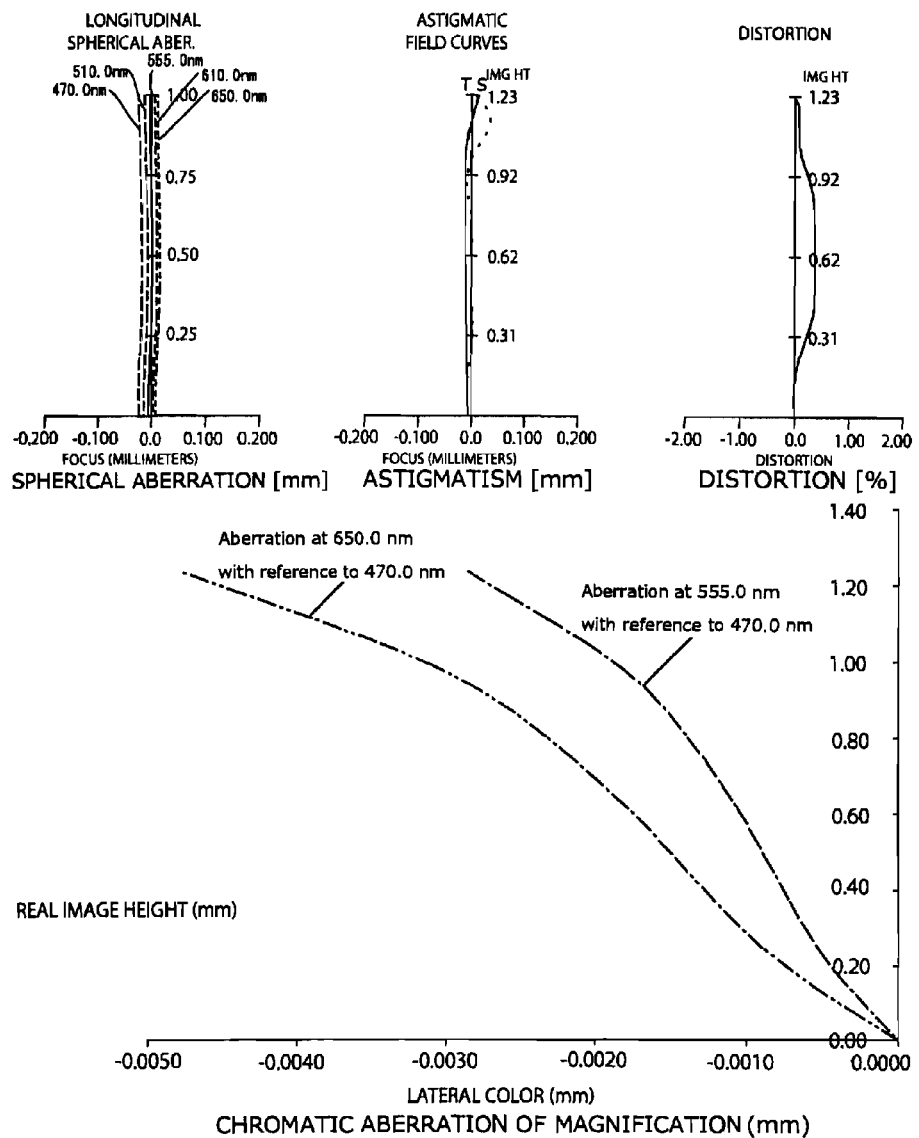
FIG. 8 shows various aberrations of the imaging lens as Example 4 according to the first embodiment of the invention.

FIG. 8 shows spherical aberration (mm), astigmatism (mm), distortion (%) and chromatic aberration of magnification (mm) for the imaging lens as Example 4.

As shown in FIG. 8, the imaging lens as Example 4 corrects various aberrations properly.

Example 5

Figure 9:
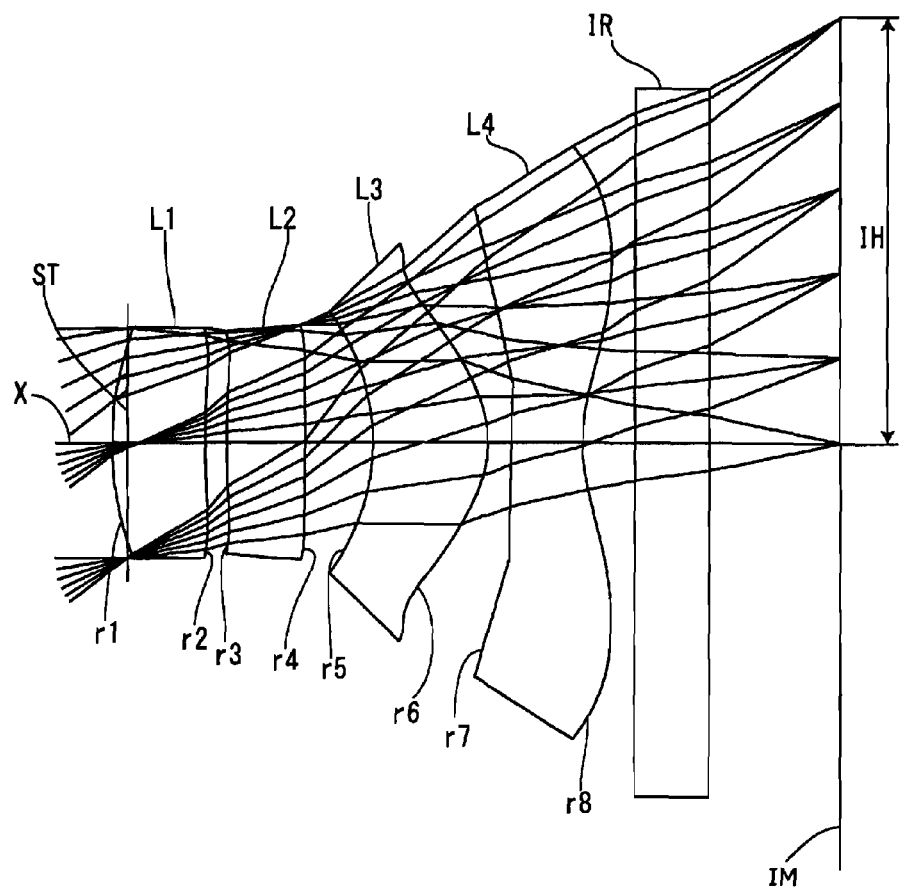
FIG. 9 is a sectional view of an imaging lens as Example 5 according to the first embodiment of the invention.

As shown in FIG. 9, in the imaging lens as Example 5, the first lens L1 is a meniscus lens with positive refractive power having a convex surface on the object side near the optical axis X, the second lens L2 is a meniscus lens with positive refractive power having a convex surface on the object side near the optical axis X, the third lens L3 is a meniscus lens with positive refractive power having a convex surface on the image side near the optical axis X, and the fourth lens L4 is a meniscus lens with negative refractive power having a concave surface on the image side near the optical axis X. The image-side aspheric surface r8 of the fourth lens L4 has a pole-change point in a position off the optical axis X. All the lenses are made of the same plastic material.

The basic lens data of Example 5 is shown in Table 5.

TABLE 5

Embodiment 5
Unit mm

| | |
|---|---|
| f = | 1.590 |
| Fno = | 2.40 |
| ω(°) = | 41.94 |
| IH = | 1.234 |

Surface Data

| Surface No. i | Curvature Radius r | Surface Distance d | Refractive Index Nd | Abbe Number vd |
|---|---|---|---|---|
| (Object Surface) | infinity | Infinity | | |
| (Stop) | Infinity | −0.045 | | |
| 1* | 0.868 | 0.269 | 1.5346 | 56.16 |
| 2* | 2.345 | 0.061 | | |
| 3* | 2.200 | 0.229 | 1.5346 | 56.16 |
| 4* | 75.647 | 0.198 | | |
| 5* | −0.627 | 0.335 | 1.5346 | 56.16 |
| 6* | −0.330 | 0.072 | | |
| 7* | 52.150 | 0.200 | 1.5346 | 56.16 |
| 8* | 0.465 | 0.200 | | |
| 9 | Infinity | 0.210 | 1.5168 | 64.20 |
| 10 | Infinity | 0.326 | | |
| Image Plane | Infinity | | | |

Constituent Lens Data

| Lens | Start Surface | Focal Length |
|---|---|---|
| 1 | 1 | 2.424 |
| 2 | 3 | 4.234 |
| 3 | 5 | 0.935 |
| 4 | 7 | −0.880 |

Aspherical Surface Data

| | 1st Surface | 2nd Surface | 3rd Surface | 4th Surface |
|---|---|---|---|---|
| k | −2.860E+00 | 1.698E+01 | −1.069E+02 | 1.948E+04 |
| A4 | 2.610E−01 | −1.261E+00 | 7.779E−02 | −8.349E−02 |
| A6 | −1.485E+00 | −7.589E+00 | −1.463E+01 | −3.708E+00 |
| A8 | 2.560E+00 | −4.127E+01 | −4.313E+01 | −3.843E+01 |
| A10 | −7.412E+01 | 1.488E+02 | 5.472E+01 | −3.077E+00 |
| A12 | 0.000E+00 | 0.000E+00 | 0.000E+00 | −1.186E+02 |
| A14 | 0.000E+00 | 0.000E+00 | 0.000E+00 | 0.000E+00 |
| A16 | 0.000E+00 | 0.000E+00 | 0.000E+00 | 0.000E+00 |

TABLE 5-continued

Embodiment 5
Unit mm

| | 5th Surface | 6th Surface | 7th Surface | 8th Surface |
|---|---|---|---|---|
| k | 1.679E−01 | −2.779E+00 | 0.000E+00 | −7.876E+00 |
| A4 | −2.422E−01 | −1.930E+00 | −1.192E+00 | −1.311E+00 |
| A6 | 3.193E+00 | 6.688E+00 | 1.820E+00 | 3.348E+00 |
| A8 | 2.627E+01 | −1.596E+01 | −1.456E+00 | −7.208E+00 |
| A10 | −5.581E+02 | 4.867E+01 | 1.199E+00 | 9.678E+00 |
| A12 | 4.736E+03 | 2.636E+02 | 1.142E−01 | −7.182E+00 |
| A14 | 1.938E+04 | −5.248E+02 | 1.046E+00 | 1.971E+00 |
| A16 | 1.264E+04 | −8.672E+02 | −2.454E+00 | 2.309E−01 |

The values of the conditional expressions are shown below:

$$TLA/(2IH)=0.82 \quad (1)$$

$$TLA/f=1.276 \quad (2)$$

$$f1/f3=2.593 \quad (3)$$

$$vd=56.16 \quad (4)$$

$$vd1=vd2=vd3=vd4 \quad (5)$$

$$(r1+r2)/(r1-r2)=-2.18 \quad (6)$$

$$|f123/f4|=1.04 \quad (7)$$

As shown above, the imaging lens as Example 5 satisfies the conditional expressions (1) to (7). In this example, since the total track length is 2.03 mm, compactness is achieved.

Figure 10:
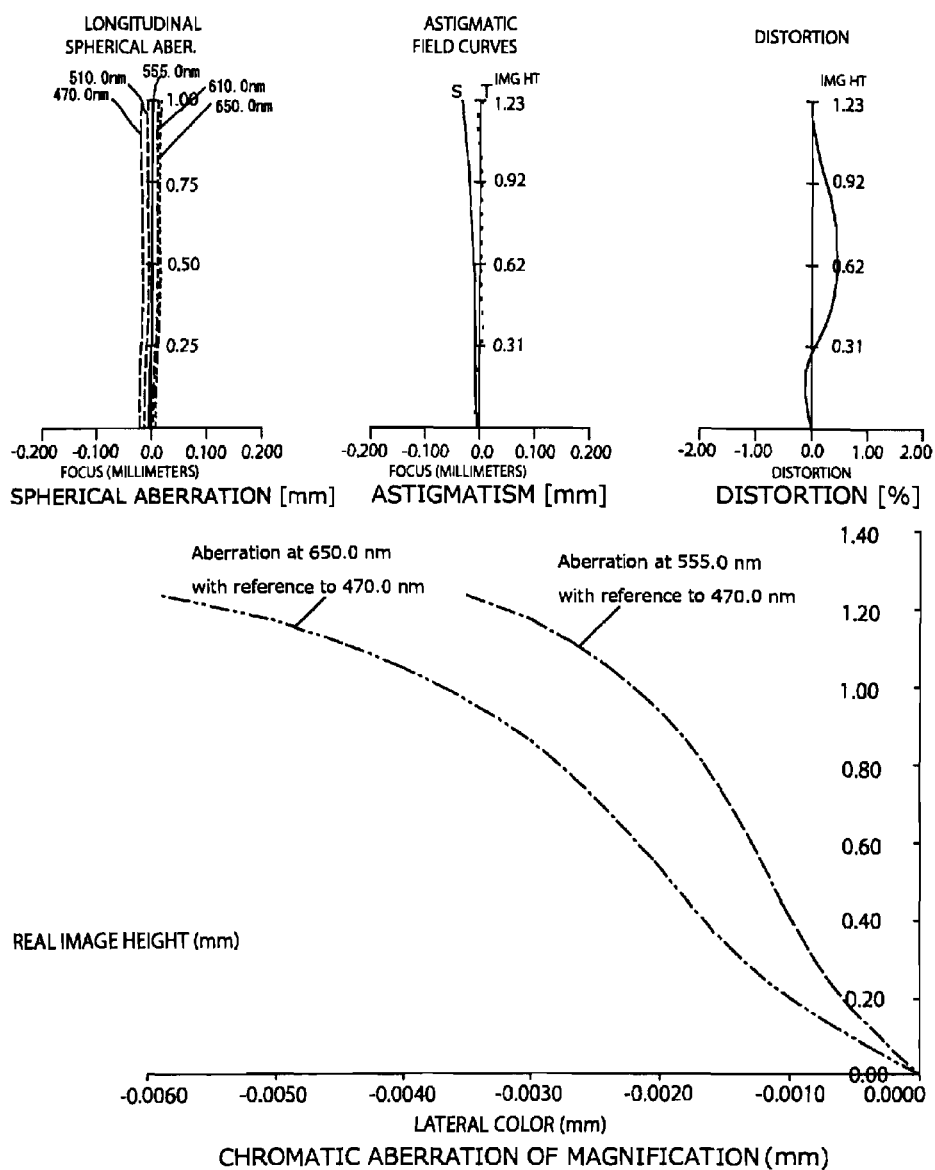
FIG. 10 shows various aberrations of the imaging lens as Example 5 according to the first embodiment of the invention.

FIG. 10 shows spherical aberration (mm), astigmatism (mm), distortion (%), and chromatic aberration of magnification (mm) for the imaging lens as Example 5.

As shown in FIG. 10, the imaging lens as Example 5 corrects various aberrations properly.

Example 6

Figure 11:
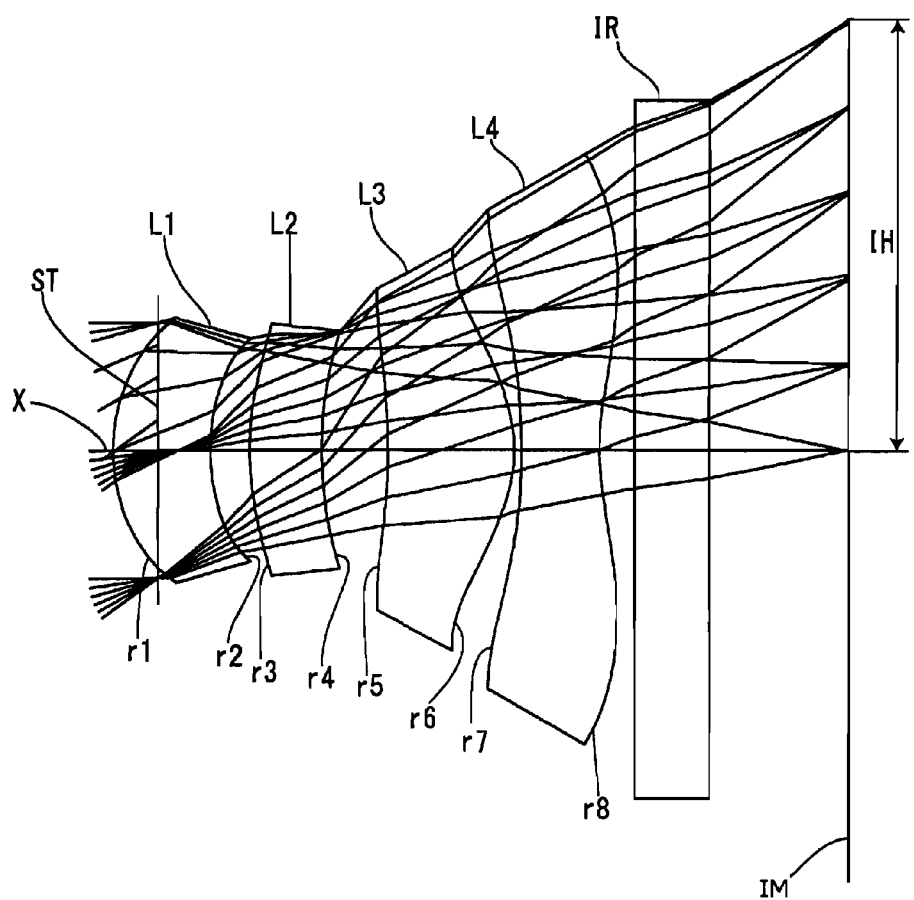
FIG. 11 is a sectional view of an imaging lens as Example 6 according to the first embodiment of the invention.

As shown in FIG. 11, in the imaging lens as Example 6, the first lens L1 is a meniscus lens with positive refractive power having a convex surface on the object side near the optical axis X, the second lens L2 is a meniscus lens with positive refractive power having a convex surface on the object side near the optical axis X, the third lens L3 is a meniscus lens with positive refractive power having a convex surface on the image side near the optical axis X, and the fourth lens L4 is a lens with negative refractive power having a biconcave shape near the optical axis X. The image-side aspheric surface r8 of the fourth lens L4 has a pole-change point in a position off the optical axis X. All the lenses are made of the same plastic material.

The basic lens data of Example 6 is shown in Table 6.

TABLE 6

Embodiment 6
Unit mm

| | |
|---|---|
| f = | 1.780 |
| Fno = | 2.44 |
| ω(°) = | 38.62 |
| IH = | 1.234 |

TABLE 6-continued

Embodiment 6
Unit mm

Surface Data

| Surface No. i | Curvature Radius r | Surface Distance d | Refractive Index Nd | Abbe Number vd |
|---|---|---|---|---|
| (Object Surface) | Infinity | Infinity | | |
| (Stop) | Infinity | −0.160 | | |
| 1* | 0.507 | 0.277 | 1.5346 | 56.16 |
| 2* | 0.594 | 0.110 | | |
| 3* | 0.857 | 0.207 | 1.5346 | 56.16 |
| 4* | 1.165 | 0.192 | | |
| 5* | −1.725 | 0.363 | 1.5346 | 56.16 |
| 6* | −0.417 | 0.020 | | |
| 7* | −1.969 | 0.223 | 1.5346 | 56.16 |
| 8* | 0.701 | 0.150 | | |
| 9 | Infinity | 0.210 | 1.5168 | 64.20 |
| 10 | Infinity | 0.341 | | |
| Image Plane | Infinity | | | |

Constituent Lens Data

| Lens | Start Surface | Focal Length |
|---|---|---|
| 1 | 1 | 3.082 |
| 2 | 3 | 4.914 |
| 3 | 5 | 0.937 |
| 4 | 7 | −0.940 |

Aspherical Surface Data

| | 1st Surface | 2nd Surface | 3rd Surface | 4th Surface |
|---|---|---|---|---|
| k | −9.355E−01 | 1.820E+00 | −2.673E+00 | 4.633E+00 |
| A4 | 8.224E−01 | −8.873E−01 | −6.599E−02 | 9.438E−02 |
| A6 | 5.696E+00 | 9.455E+00 | −3.034E−01 | −2.144E+00 |
| A8 | −2.885E+01 | −1.696E+02 | −6.686E+01 | −2.605E+01 |
| A10 | 2.376E+02 | 1.032E+03 | 3.728E+02 | 7.152E+01 |
| A12 | 0.000E+00 | 0.000E+00 | 0.000E+00 | −1.369E+02 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | −4.833E+00 | −4.106E+00 | 0.000E+00 | −1.547E+01 |
| A4 | −6.442E−02 | −1.313E+00 | −6.242E−01 | −1.070E+00 |
| A6 | 3.103E+00 | 8.230E+00 | 2.690E+00 | 2.669E+00 |
| A8 | 5.603E+01 | −1.387E+01 | −2.486E+00 | −5.709E+00 |
| A10 | −7.936E+02 | 9.499E+00 | −1.369E−01 | 8.121E+00 |
| A12 | 4.579E+03 | 9.565E+01 | 1.515E−01 | −7.032E+00 |
| A14 | −1.254E+04 | −3.857E+02 | 1.839E+00 | 2.976E+00 |
| A16 | 1.292E+04 | 3.878E+02 | −1.218E+00 | −2.847E−01 |

The values of the conditional expressions are shown below:

$$TLA/(2IH)=0.82 \quad (1)$$

$$TLA/f=1.14 \quad (2)$$

$$f1/f3=3.289 \quad (3)$$

$$vd=56.16 \quad (4)$$

$$vd1=vd2=vd3=vd4 \quad (5)$$

$$(r1+r2)/(r1-r2)=-12.74 \quad (6)$$

$$|f123/f4|=1.11 \quad (7)$$

As shown above, the imaging lens as Example 6 satisfies the conditional expressions (1) to (7). In this example, since the total track length is 2.02 mm, compactness is achieved.

Figure 12:
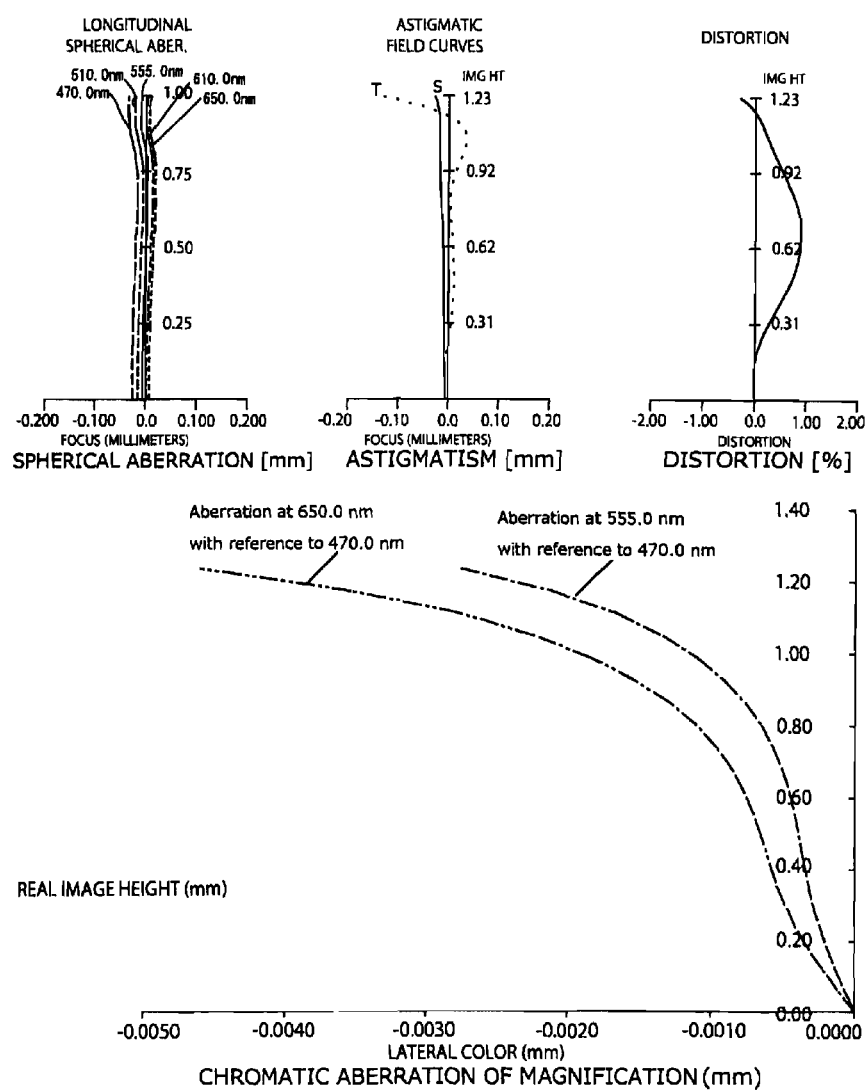
FIG. 12 shows various aberrations of the imaging lens as Example 6 according to the first embodiment of the invention.

FIG. 12 shows spherical aberration (mm), astigmatism (mm), distortion (%), and chromatic aberration of magnification (mm) for the imaging lens as Example 6.

As shown in FIG. 12, the imaging lens as Example 6 corrects various aberrations properly.

Example 7

Figure 13:
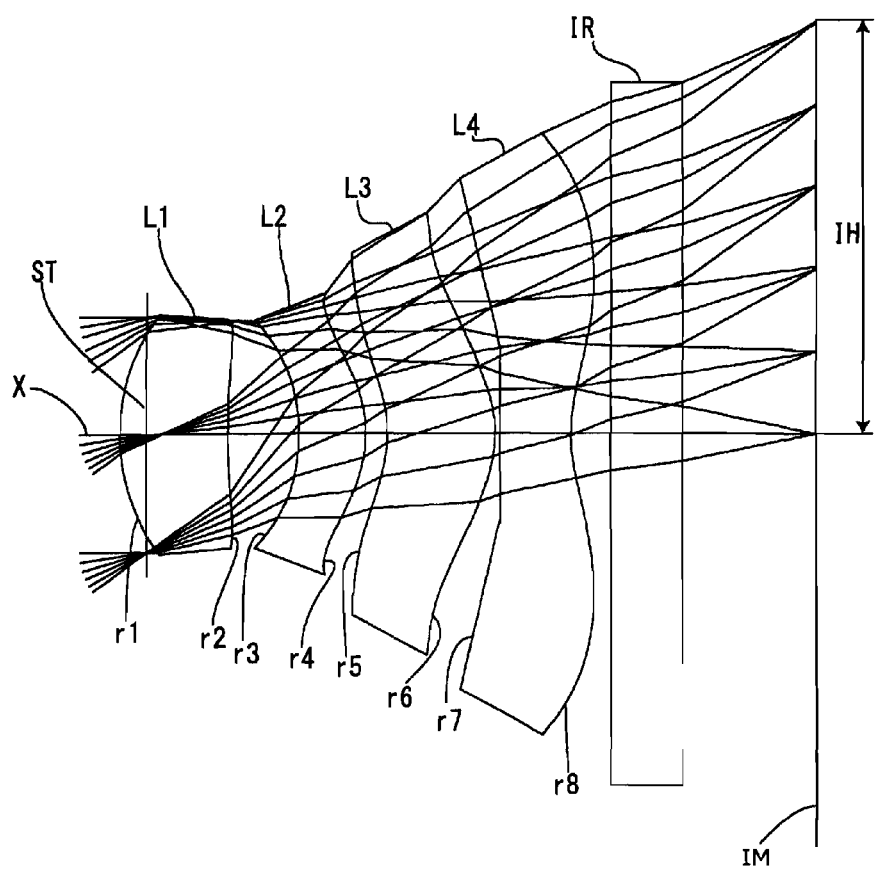
FIG. 13 is a sectional view of an imaging lens as Example 7 according to the first embodiment of the invention.

As shown in FIG. 13, in the imaging lens as Example 7, the first lens L1 is a meniscus lens with positive refractive power having a convex surface on the object side near the optical axis X, the second lens L2 is a meniscus lens with positive refractive power having a convex surface on the image side near the optical axis X, the third lens L3 is a meniscus lens with positive refractive power having a convex surface on the image side near the optical axis X, and the fourth lens L4 is a meniscus lens with negative refractive power having a concave surface on the image side near the optical axis X. The image-side aspheric surface r8 of the fourth lens L4 has a pole-change point in a position off the optical axis X. All the lenses are made of the same plastic material.

The basic lens data of Example 7 is shown in Table 7.

TABLE 7

Embodiment 7
Unit mm

| f = | 1.700 |
|---|---|
| Fno = | 2.43 |
| ω(°) = | 39.97 |
| IH = | 1.234 |

Surface Data

| Surface No. i | Curvature Radius r | Surface Distance d | Refractive Index Nd | Abbe Number vd |
|---|---|---|---|---|
| (Object Surface) | Infinity | Infinity | | |
| (Stop) | Infinity | −0.080 | | |
| 1* | 0.598 | 0.319 | 1.5346 | 56.16 |
| 2* | 2.219 | 0.212 | | |
| 3* | −0.597 | 0.201 | 1.5346 | 56.16 |
| 4* | −0.368 | 0.066 | | |
| 5* | −0.377 | 0.320 | 1.5346 | 56.16 |
| 6* | −0.359 | 0.020 | | |
| 7* | 30.490 | 0.206 | 1.5346 | 56.16 |
| 8* | 0.454 | 0.150 | | |
| 9 | Infinity | 0.210 | 1.5168 | 64.20 |
| 10 | Infinity | 0.359 | | |
| Image Plane | Infinity | | | |

Constituent Lens Data

| Lens | Start Surface | Focal Length |
|---|---|---|
| 1 | 1 | 1.432 |
| 2 | 3 | 1.374 |
| 3 | 5 | 1.953 |
| 4 | 7 | −0.863 |

Aspherical Surface Data

| | 1st Surface | 2nd Surface | 3rd Surface | 4th Surface |
|---|---|---|---|---|
| k | −1.092E+00 | 2.395E+01 | −5.328E−01 | −5.006E−01 |
| A4 | 5.987E−01 | 4.488E−01 | −3.268E+00 | 3.782E+00 |
| A6 | −1.168E+00 | −8.891E+00 | 1.784E+00 | 2.548E+00 |
| A8 | 3.993E+01 | 3.235E+01 | 1.298E+02 | 3.982E+01 |
| A10 | −2.081E+02 | −4.180E+02 | −7.789E+02 | 1.134E+01 |
| A12 | 0.000E+00 | 0.000E+00 | 0.000E+00 | 2.407E+02 |
| A14 | 0.000E+00 | 0.000E+00 | 0.000E+00 | 0.000E+00 |
| A16 | 0.000E+00 | 0.000E+00 | 0.000E+00 | 0.000E+00 |

TABLE 7-continued

Embodiment 7
Unit mm

|   | 5th Surface | 6th Surface | 7th Surface | 8th Surface |
|---|---|---|---|---|
| k | −3.231E+00 | −4.537E+00 | 0.000E+00 | −1.076E+01 |
| A4 | 3.196E+00 | −6.090E−01 | −1.894E+00 | −1.377E+00 |
| A6 | −8.944E+00 | 4.780E+00 | 3.232E+00 | 3.424E+00 |
| A8 | 4.809E+01 | −1.581E+01 | −1.291E−01 | −6.939E+00 |
| A10 | −6.570E+02 | 2.542E+01 | −3.719E−02 | 9.286E+00 |
| A12 | 4.335E+03 | 1.172E+02 | −2.036E−03 | −7.214E+00 |
| A14 | −1.277E+04 | −4.882E+02 | −1.824E+00 | 1.989E+00 |
| A16 | 1.406E+04 | 4.637E+02 | 5.045E+00 | 4.477E−01 |

The values of the conditional expressions are shown below:

$$TLA/(2IH)=0.81 \quad (1)$$

$$TLA/f=1.17 \quad (2)$$

$$f1/f3=0.84 \quad (3)$$

$$vd=56.16 \quad (4)$$

$$vd1=vd2=vd3=vd4 \quad (5)$$

$$(r1+r2)/(r1-r2)=-1.13 \quad (6)$$

$$f123/|f4|=1.13 \quad (7)$$

As shown above, the imaging lens as Example 7 satisfies the conditional expressions (1) to (7). In this example, since the total track length is 1.99 mm, compactness is achieved.

Figure 14:
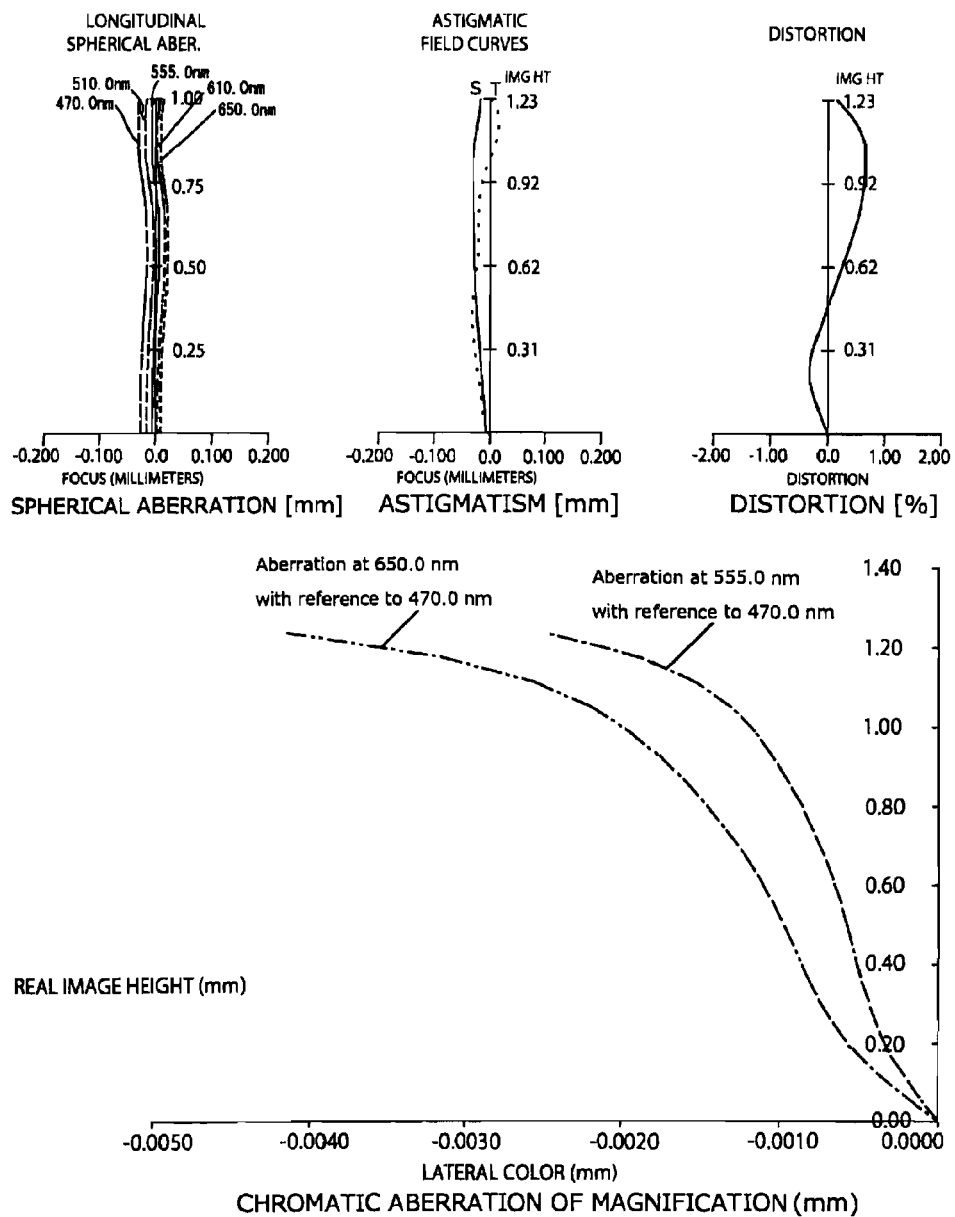
FIG. 14 shows various aberrations of the imaging lens as Example 7 according to the first embodiment of the invention.

FIG. 14 shows spherical aberration (mm), astigmatism (mm), distortion (%), and chromatic aberration of magnification (mm) for the imaging lens as Example 7.

As shown in FIG. 14, the imaging lens as Example 7 corrects various aberrations properly.

Example 8

Figure 15:
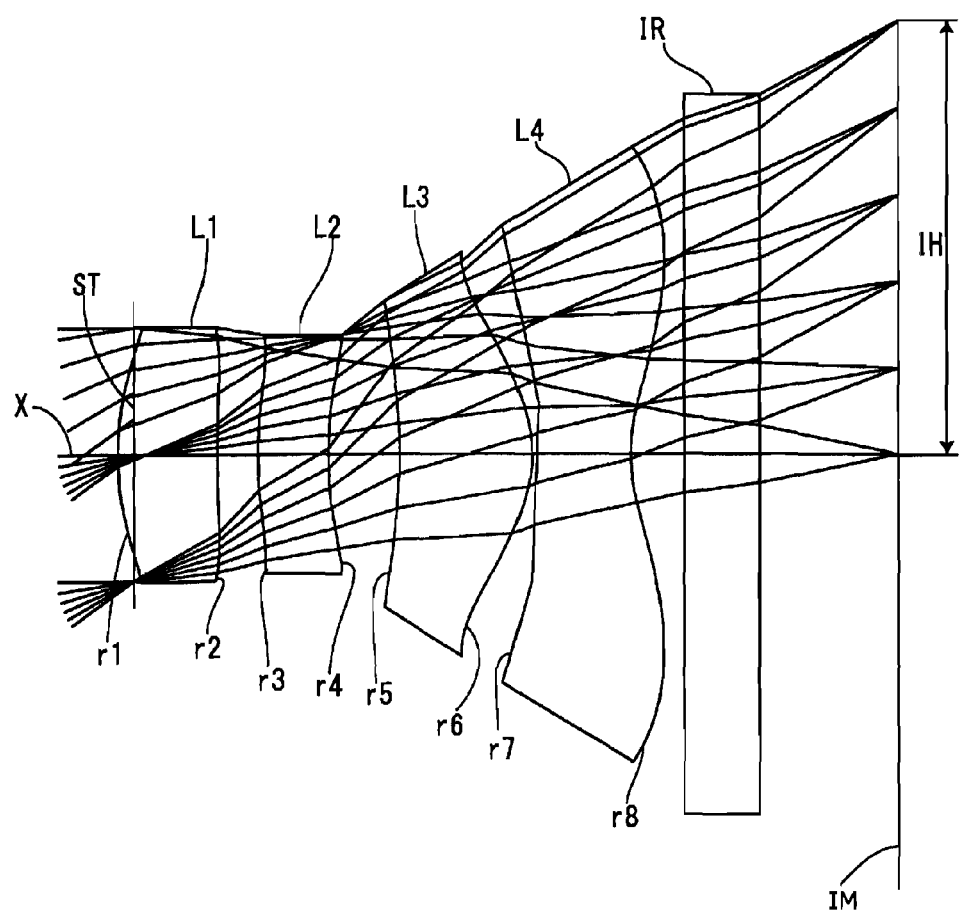
FIG. 15 is a sectional view of an imaging lens as Example 8 according to the first embodiment of the invention.

As shown in FIG. 15, in the imaging lens as Example 8, the first lens L1 is a meniscus lens with positive refractive power having a convex surface on the object side near the optical axis X, the second lens L2 is a meniscus lens with positive refractive power having a convex surface on the object side near the optical axis X, the third lens L3 is a meniscus lens with positive refractive power having a convex surface on the image side near the optical axis X, and the fourth lens L4 is a meniscus lens with negative refractive power having a concave surface on the image side near the optical axis X. The image-side aspheric surface r8 of the fourth lens L4 has a pole-change point in a position off the optical axis X. All the lenses are made of the same plastic material.

The basic lens data of Example 8 is shown in Table 8.

TABLE 8

Embodiment 8
Unit mm

| f = | 1.740 |
|---|---|
| Fno = | 2.41 |
| ω(°) = | 39.75 |
| IH = | 1.234 |

TABLE 8-continued

Embodiment 8
Unit mm

Surface Data

| Surface No. i | Curvature Radius r | Surface Distance d | Refractive Index Nd | Abbe Number vd |
|---|---|---|---|---|
| (Object Surface) | Infinity | Infinity | | |
| (Stop) | Infinity | −0.045 | | |
| 1* | 0.861 | 0.280 | 1.5346 | 56.16 |
| 2* | 2.214 | 0.116 | | |
| 3* | 1.098 | 0.200 | 1.5346 | 56.16 |
| 4* | 1.098 | 0.203 | | |
| 5* | −1.510 | 0.377 | 1.5346 | 56.16 |
| 6* | −0.391 | 0.020 | | |
| 7* | 101.785 | 0.260 | 1.5346 | 56.16 |
| 8* | 0.450 | 0.120 | | |
| 9 | Infinity | 0.210 | 1.5168 | 64.20 |
| 10 | Infinity | 0.415 | | |
| Image Plane | Infinity | | | |

Constituent Lens Data

| Lens | Start Surface | Focal Length |
|---|---|---|
| 1 | 1 | 2.459 |
| 2 | 3 | 32.421 |
| 3 | 5 | 0.882 |
| 4 | 7 | −0.848 |

Aspherical Surface Data

|   | 1st Surface | 2nd Surface | 3rd Surface | 4th Surface |
|---|---|---|---|---|
| k | −3.035E+00 | −3.725E+01 | −1.116E+01 | 1.485E+00 |
| A4 | 2.169E−01 | −1.373E+00 | −1.114E+00 | −4.450E−01 |
| A6 | −8.867E−01 | −2.480E+00 | −9.714E+00 | −8.215E+00 |
| A8 | −7.031E+00 | −4.700E+00 | −2.287E+00 | 9.385E+00 |
| A10 | −1.001E+01 | 5.357E+01 | 2.428E+02 | 1.160E+02 |
| A12 | 0.000E+00 | 0.000E+00 | 0.000E+00 | −1.186E+02 |
| A14 | 0.000E+00 | 0.000E+00 | 0.000E+00 | 0.000E+00 |
| A16 | 0.000E+00 | 0.000E+00 | 0.000E+00 | 0.000E+00 |

|   | 5th Surface | 6th Surface | 7th Surface | 8th Surface |
|---|---|---|---|---|
| k | −2.583E+01 | −3.950E+00 | 0.000E+00 | −7.359E+00 |
| A4 | 9.436E−02 | −1.294E+00 | −1.602E+00 | −1.254E+00 |
| A6 | −2.753E+00 | 6.552E+00 | 2.898E+00 | 3.139E+00 |
| A8 | 7.573E+01 | −1.379E+01 | −1.181E+00 | −6.204E+00 |
| A10 | −8.263E+02 | 2.045E+01 | 8.829E−01 | 8.040E+00 |
| A12 | 4.398E+03 | 1.123E+02 | −1.808E+00 | −6.678E+00 |
| A14 | −1.162E+04 | −4.083E+02 | −2.455E+00 | 3.230E+00 |
| A16 | 1.264E+04 | 3.113E+02 | 3.572E+00 | −7.489E−01 |

The values of the conditional expressions are shown below:

$$TLA/(2IH)=0.86 \quad (1)$$

$$TLA/f=1.22 \quad (2)$$

$$f1/f3=2.788 \quad (3)$$

$$vd=56.16 \quad (4)$$

$$vd1=vd2=vd3=vd4 \quad (5)$$

$$(r1+r2)/(r1-r2)=-2.27 \quad (6)$$

$$f123/|f4|=1.14 \quad (7)$$

As shown above, the imaging lens as Example 8 satisfies the conditional expressions (1) to (7). In this example, since the total track length is 2.13 mm, compactness is achieved.

Figure 16:
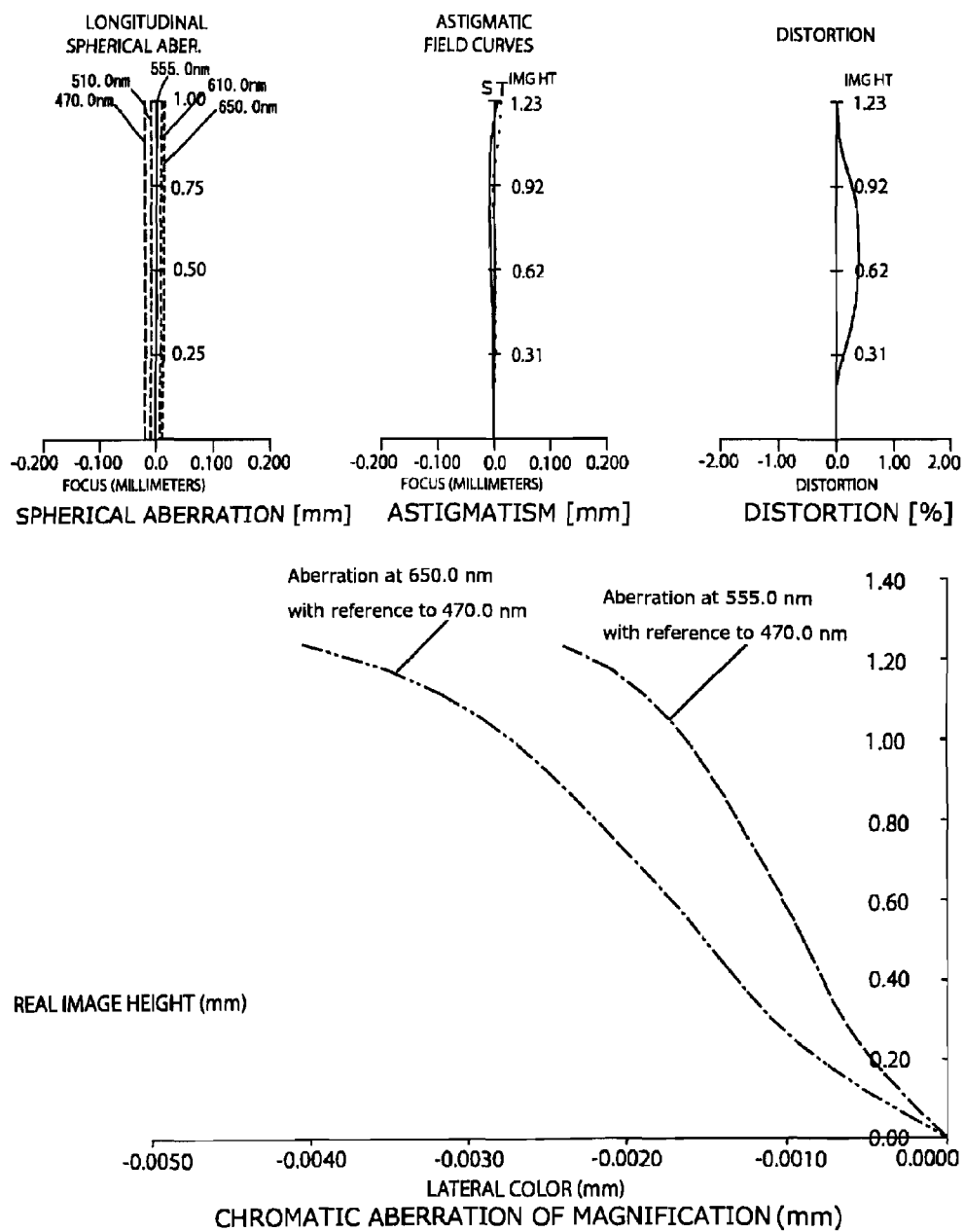
FIG. 16 shows various aberrations of the imaging lens as Example 8 according to the first embodiment of the invention.

FIG. 16 shows spherical aberration (mm), astigmatism (mm), distortion (%) and chromatic aberration of magnification (mm) for the imaging lens as Example 8.

As shown in FIG. 16, the imaging lens as Example 8 corrects various aberrations properly.

Second Embodiment

Figure 17:
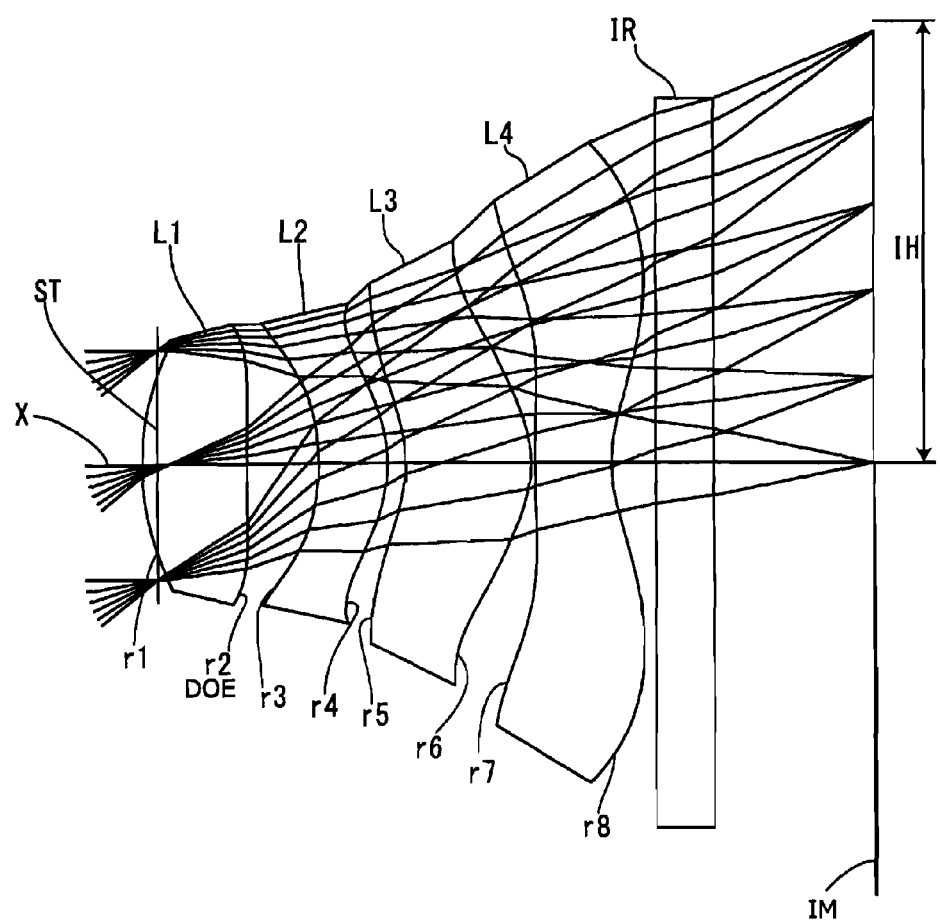
FIG. 17 is a sectional view of an imaging lens as Example 9 according to a second embodiment of the invention.
Figure 19:
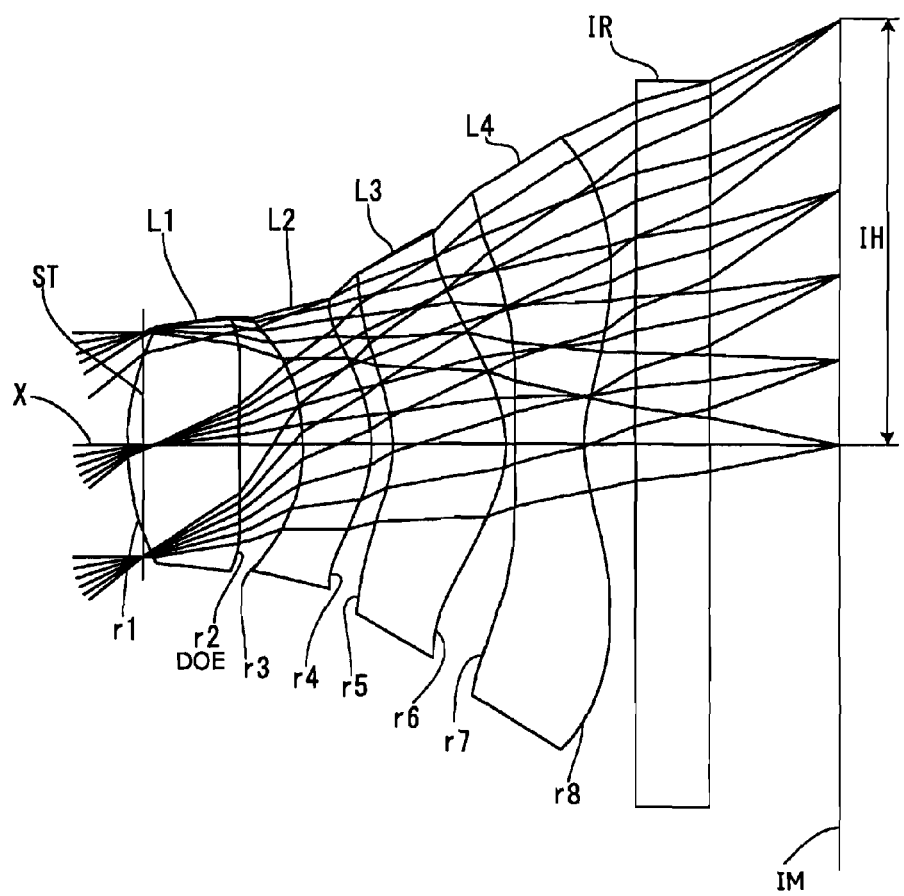
FIG. 19 is a sectional view of an imaging lens as Example 10 according to the second embodiment of the invention.
Figure 21:
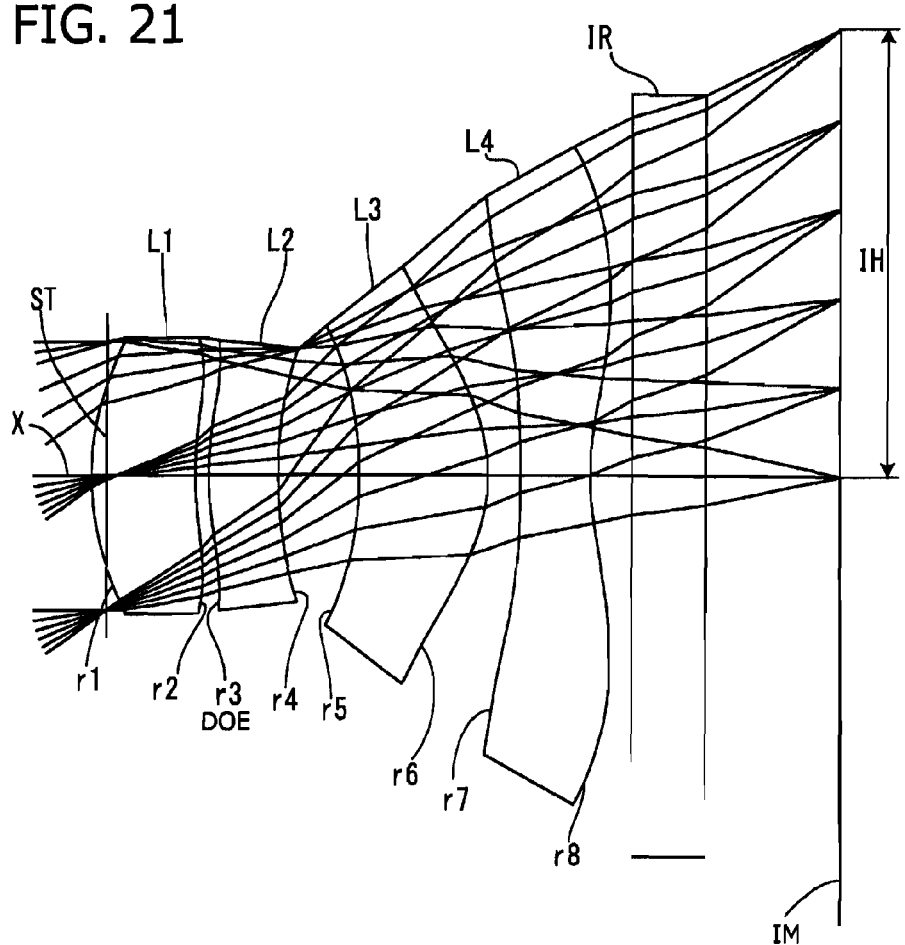
FIG. 21 is a sectional view of an imaging lens as Example 11 according to the second embodiment of the invention.

A second embodiment of the present invention will be described in detail referring to drawings. FIGS. 17, 19, and 21 are sectional views of the imaging lenses as Examples 9 to 11 according to the second embodiment of the present invention respectively. In all the examples according to the second embodiment as well, an aperture stop ST is located in the effective diameter peripheral area on the object-side surface r1 of the first lens L1. A filter IR which includes surfaces r9 and r10 is located between the image-side surface r8 of the fourth lens L4 and the image plane IM. In the figures, X represents an optical axis. In calculation of a distance on the optical axis, the filter IR (r9 and r10) is removed.

The second embodiment is different from the first embodiment in that a diffractive optical surface is formed on an appropriate surface. This enhances the ability to correct chromatic aberration. The diffractive optical surface corrects chromatic aberration by inversion of the wavelength-dependence of refraction index of emitted light and permits chromatic aberration correction without the need for an additional lens.

As in the first embodiment, in the second embodiment, all lens surfaces are aspheric surfaces expressed by Equation 1. In the figures, DOE represents a diffractive optical surface. A diffractive optical surface DOE is formed on at least one of the surfaces from the object-side surface r1 of the first lens L1 to the image-side surface r4 of the second lens L2 in accordance with the optical path difference function expressed by Equation 2.

$$P = \sum_{i=1}^{7} B_{2i} H^{2i} \quad \text{Equation 2}$$

where
P: optical path difference
$B_{2i}$: coefficient of optical path difference function (i=1 to 7)

Example 9

In this example, the maximum image height is larger than in the other examples so that it can be applied to, for example, a ¼-inch image sensor. Generally as the image sensor size is larger, the optical system must be larger, making it difficult to correct various aberrations. Particularly, a known technique to correct chromatic aberrations properly is that the lens configuration includes a negative lens with a small Abbe number. However, an increase in negative refractive power in the lens configuration is disadvantageous in shortening the total track length.

As shown in FIG. 17, in the imaging lens as Example 9, the first lens L1 is a meniscus lens with positive refractive power having a convex surface on the object side near the optical axis X, the second lens L2 is a meniscus lens with positive refractive power having a convex surface on the image side near the optical axis X, the third lens L3 is a meniscus lens with positive refractive power having a convex surface on the image side near the optical axis X, and the fourth lens L4 is a meniscus lens with negative refractive power having a concave surface on the image side near the optical axis X. The image-side aspheric surface r8 of the fourth lens L4 has a pole-change point in a position off the optical axis X. All the lenses are made of the same plastic material. A diffractive optical surface DOE is formed on the image-side surface r2 of the first lens L1.

The basic lens data of Example 9 is shown in Table 9.

TABLE 9

Embodiment 9
Unit mm

| | |
|---|---|
| f = | 2.875 |
| Fno = | 2.40 |
| ω(°) = | 42.22 |
| IH = | 2.250 |

Surface Data

| Surface No. i | Curvature Radius r | Surface Distance d | Refractive Index Nd | Abbe Number vd |
|---|---|---|---|---|
| (Object Surface) | Infinity | Infinity | | |
| (Stop) | Infinity | −0.080 | | |
| 1* | 1.378 | 0.542 | 1.5346 | 56.16 |
| 2* | 9.855 | 0.376 | | |
| 3* | −1.258 | 0.361 | 1.5346 | 56.16 |
| 4* | −0.767 | 0.097 | | |
| 5* | −0.736 | 0.655 | 1.5346 | 56.16 |
| 6* | −0.621 | 0.021 | | |
| 7* | 4.942 | 0.399 | 1.5346 | 56.16 |
| 8* | 0.693 | 0.411 | | |
| 9 | Infinity | 0.300 | 1.5168 | 64.20 |
| 10 | Infinity | 0.639 | | |
| Image Plane | Infinity | | | |

Constituent Lens Data

| Lens | Start Surface | Focal Length |
|---|---|---|
| 1 | 1 | 2.713 |
| 2 | 3 | 2.924 |
| 3 | 5 | 2.475 |
| 4 | 7 | −1.554 |

Aspherical Surface Data

| | 1st Surface | 2nd Surface | 3rd Surface | 4th Surface |
|---|---|---|---|---|
| k | −1.488E+00 | 5.075E+01 | −1.483E−01 | −4.940E−01 |
| A4 | 6.011E−02 | −1.488E−01 | −5.591E−01 | 3.868E−01 |
| A6 | −1.746E−01 | −2.781E−01 | 1.931E−01 | 2.775E−01 |
| A8 | 4.676E−01 | −5.657E−01 | 8.921E−01 | 4.824E−01 |
| A10 | −9.822E−01 | 6.034E−01 | −1.594E−01 | −3.995E−01 |
| A12 | 0.000E+00 | 0.000E+00 | 0.000E+00 | 1.726E−01 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | −2.492E+00 | −4.114E+00 | 0.000E+00 | −7.878E+00 |
| A4 | 5.300E−01 | −1.396E−01 | −3.273E−01 | −2.172E−01 |
| A6 | −2.875E−01 | 2.164E−01 | 1.375E−01 | 1.599E−01 |
| A8 | 5.904E−01 | −1.934E−01 | −9.742E−03 | −9.806E−02 |
| A10 | −2.781E+00 | 1.228E−01 | 2.327E−03 | 3.864E−02 |
| A12 | 5.261E+00 | 1.366E−01 | −2.036E−03 | −8.658E−03 |
| A14 | −4.488E+00 | −1.875E−01 | −5.612E−04 | 8.032E−04 |
| A16 | 1.451E+00 | 5.446E−02 | 2.647E−04 | 6.476E−07 |

Optical Path Difference Function

| | |
|---|---|
| B2 | −1.510E−02 |
| B4 | −7.319E−03 |
| B6 | 3.277E−02 |

TABLE 9-continued

Embodiment 9
Unit mm

| | |
|---|---|
| B8 | 1.022E−01 |
| B10 | −1.971E−01 |
| B12 | −4.273E−01 |
| B14 | 7.081E−01 |

The values of the conditional expressions are shown below:

$TLA/(2IH)=0.82$ (1)

$TLA/f=1.29$ (2)

$f1/f3=1.096$ (3)

$vd=56.16$ (4)

$vd1=vd2=vd3=vd4$ (5)

$(r1+r2)/(r1-r2)=-1.33$ (6)

$|f123/f4|=1.05$ (7)

As shown above, the imaging lens as Example 9 satisfies the conditional expressions (1) to (7) described in the appended claims. In this example, since the total track length is 3.69 mm, compactness is achieved.

When a diffractive optical surface with a function to correct chromatic aberration is formed on the image-side surface r2 of the first lens L1 as in this example, chromatic aberration can be corrected properly without the need for a lens with negative refractive power.

Figure 18:
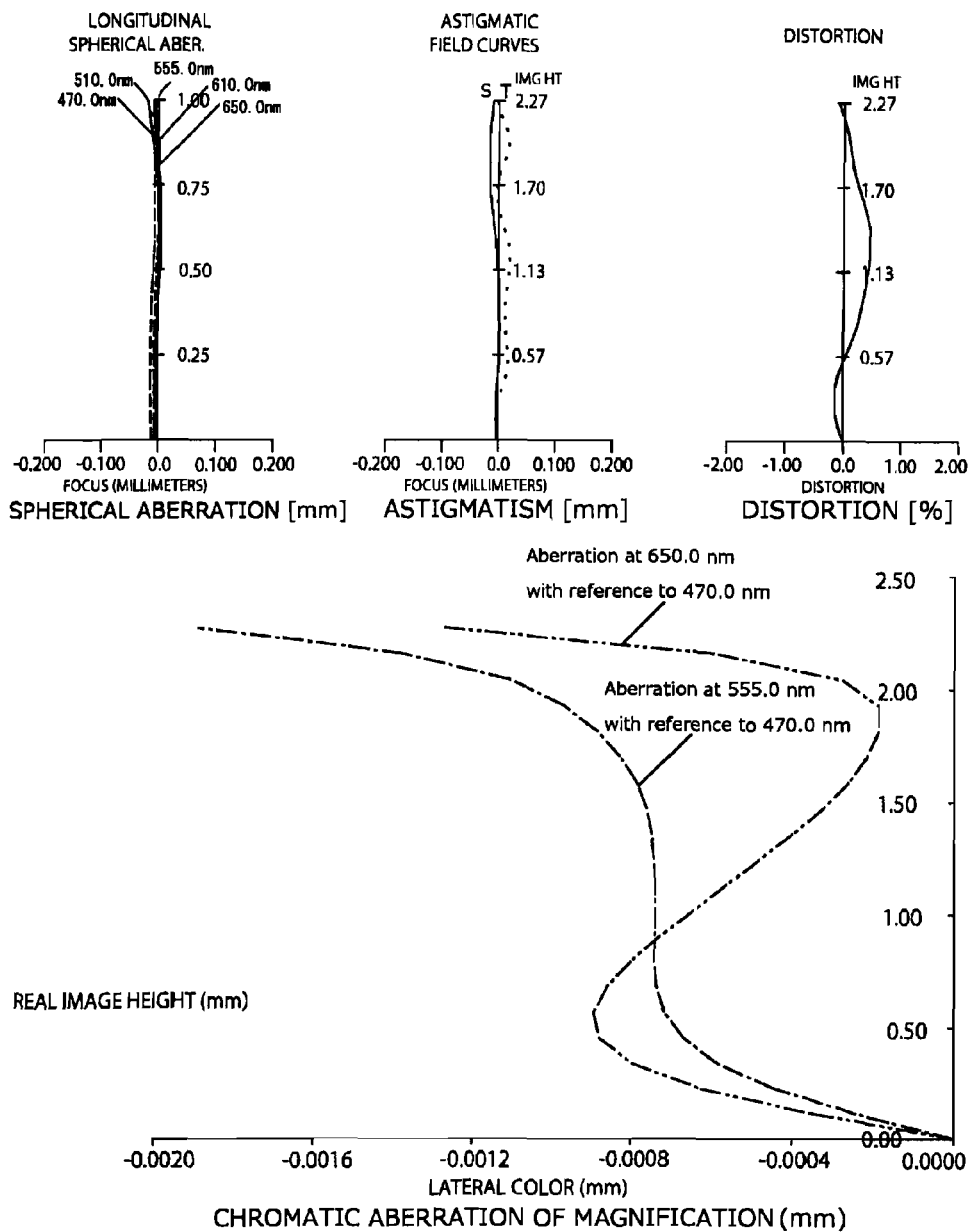
FIG. 18 shows various aberrations of the imaging lens as Example 9 according to the second embodiment of the invention.

FIG. 18 shows spherical aberration (mm), astigmatism (mm), distortion (%) and chromatic aberration of magnification (mm) for the imaging lens as Example 9. Among these diagrams, the spherical aberration diagram shows the amount of aberration at wavelengths of 470.0 nm, 510.0 nm, 555.0 nm, 610.0 nm, and 650.0 nm, the astigmatism diagram shows the amount of aberration on sagittal image surface S and the amount of aberration on tangential image surface T, and the diagram of chromatic aberration of magnification shows the amount of aberration at 555.0 nm with respect to reference waveform 470.0 nm and the amount of aberration at 650.0 nm with respect to 470.0 nm (the same is true for FIGS. 20 and 22).

As shown in FIG. 18, the imaging lens as Example 9 corrects various aberrations properly.

Example 10

As shown in FIG. 19, in the imaging lens as Example 10, the first lens L1 is a meniscus lens with positive refractive power having a convex surface on the object side near the optical axis X, the second lens L2 is a meniscus lens with positive refractive power having a convex surface on the image side near the optical axis X, the third lens L3 is a meniscus lens with positive refractive power having a convex surface on the image side near the optical axis X, and the fourth lens L4 is a meniscus lens with negative refractive power having a concave surface on the image side near the optical axis X. The image-side aspheric surface r8 of the fourth lens L4 has a pole-change point in a position off the optical axis X. All the lenses are made of the same plastic material. A diffractive optical surface DOE is formed on the image-side surface r2 of the first lens L1.

The basic lens data of Example 10 is shown in Table 10.

TABLE 10

Embodiment 10
Unit mm

| | |
|---|---|
| f = | 1.566 |
| Fno = | 2.41 |
| ω(°) = | 42.48 |
| IH = | 1.234 |

Surface Data

| Surface No. i | Curvature Radius r | Surface Distance d | Refractive Index Nd | Abbe Number vd |
|---|---|---|---|---|
| (Object Surface) | Infinity | Infinity | | |
| (Stop) | Infinity | −0.045 | | |
| 1* | 0.717 | 0.321 | 1.5346 | 56.16 |
| 2* | 4.416 | 0.184 | | |
| 3* | −0.632 | 0.200 | 1.5346 | 56.16 |
| 4* | −0.401 | 0.063 | | |
| 5* | −0.407 | 0.328 | 1.5346 | 56.16 |
| 6* | −0.348 | 0.027 | | |
| 7* | 5.734 | 0.200 | 1.5346 | 56.16 |
| 8* | 0.428 | 0.200 | | |
| 9 | Infinity | 0.210 | 1.5168 | 64.20 |
| 10 | Infinity | 0.319 | | |
| Image Plane | Infinity | | | |

Constituent Lens Data

| Lens | Start Surface | Focal Length |
|---|---|---|
| 1 | 1 | 1.443 |
| 2 | 3 | 1.576 |
| 3 | 5 | 1.528 |
| 4 | 7 | −0.878 |

Aspherical Surface Data

| | 1st Surface | 2nd Surface | 3rd Surface | 4th Surface |
|---|---|---|---|---|
| k | −1.231E+00 | 4.025E+01 | −2.229E−01 | −5.001E−01 |
| A4 | 4.392E−01 | −9.223E−01 | −3.458E+00 | 2.691E+00 |
| A6 | −4.311E+00 | −6.759E+00 | 6.889E+00 | 5.511E+00 |
| A8 | 4.803E+01 | −3.915E+01 | 4.071E+01 | 3.860E+01 |
| A10 | −2.803E+02 | 1.021E+02 | −4.099E+01 | −8.089E+01 |
| A12 | 0.000E+00 | 0.000E+00 | 0.000E+00 | 1.207E+02 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | −2.666E+00 | −4.062E+00 | 0.000E+00 | −9.144E+00 |
| A4 | 3.110E+00 | −8.551E−01 | −1.912E+00 | −1.365E+00 |
| A6 | −6.197E+00 | 4.980E+00 | 2.977E+00 | 3.356E+00 |
| A8 | 4.475E+01 | −1.359E+01 | −6.533E−01 | −6.882E+00 |
| A10 | −6.815E+02 | 2.768E+01 | 4.535E−01 | 9.252E+00 |
| A12 | 4.319E+03 | 1.068E+02 | −1.882E+00 | −7.137E+00 |
| A14 | −1.250E+04 | −5.210E+02 | −1.735E+00 | 2.121E+00 |
| A16 | 1.377E+04 | 5.364E+02 | 2.952E+00 | 1.886E−01 |

Optical Path Difference Function

| | |
|---|---|
| B2 | −2.784E−02 |
| B4 | −4.012E−02 |
| B6 | 7.184E−01 |
| B8 | 6.097E+00 |
| B10 | −4.505E+01 |
| B12 | −4.222E+02 |
| B14 | 2.508E+03 |

The values of the conditional expressions are shown below:

$TLA/(2IH)=0.80$ (1)

$TLA/f=1.26$ (2)

$f1/f3=0.944$ (3)

$vd=56.16$ (4)

$$vd1=vd2=vd3=vd4 \quad (5)$$

$$(r1+r2)/(r1-r2)=-1.39 \quad (6)$$

$$|f123/f4|=1.03 \quad (7)$$

As shown above, the imaging lens as Example 10 satisfies the conditional expressions (1) to (7). In this example, since the total track length is 1.98 mm, compactness is achieved.

Figure 20:
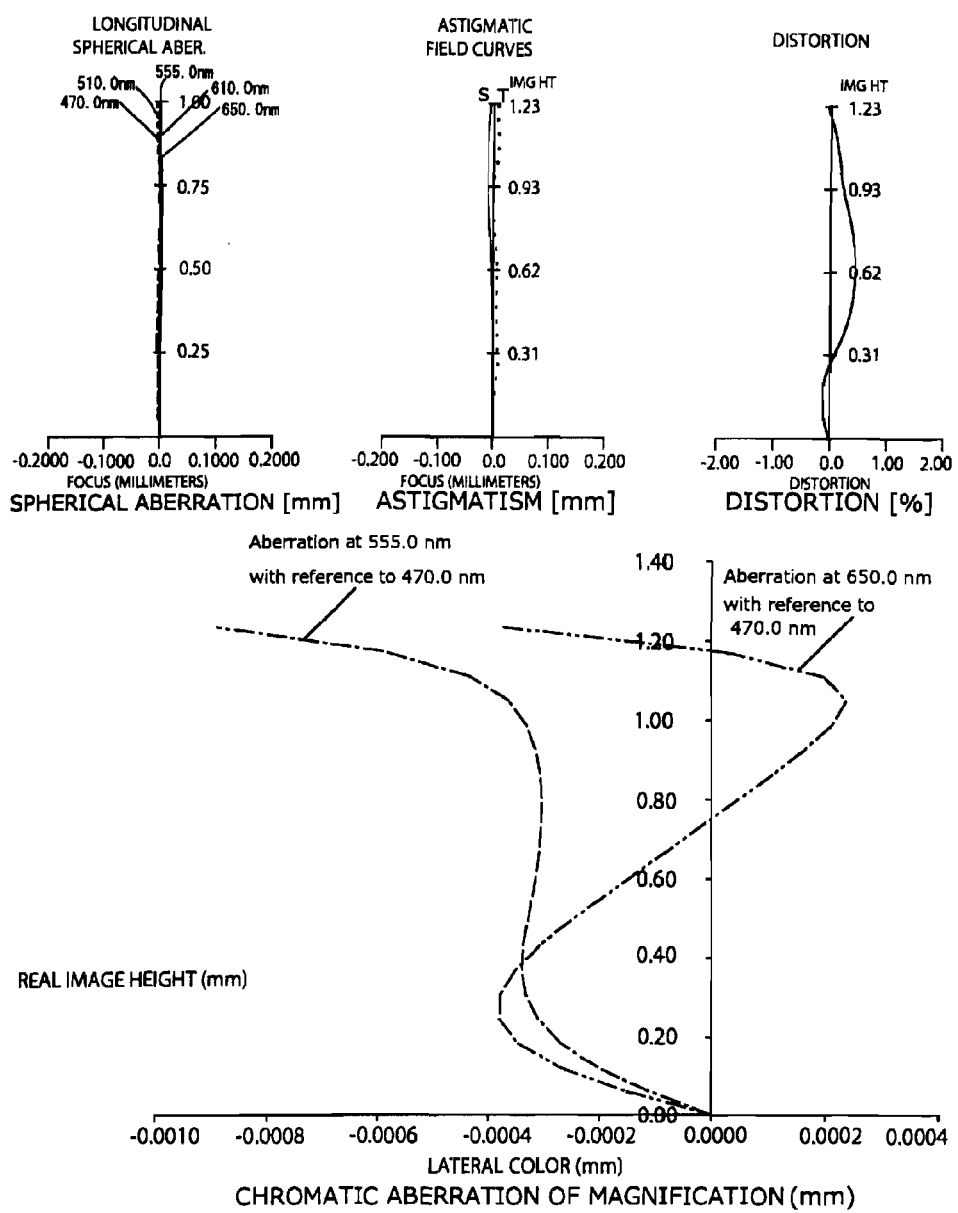
FIG. 20 shows various aberrations of the imaging lens as Example 10 according to the second embodiment of the invention.

FIG. 20 shows spherical aberration (mm), astigmatism (mm), distortion (%), and chromatic aberration of magnification (mm) for the imaging lens as Example 10.

As shown in FIG. 20, the imaging lens as Example 10 corrects various aberrations properly.

Example 11

As shown in FIG. 21, in the imaging lens as Example 11, the first lens L1 is a meniscus lens with positive refractive power having a convex surface on the object side near the optical axis X, the second lens L2 is a meniscus lens with positive refractive power having a convex surface on the object side near the optical axis X, the third lens L3 is a meniscus lens with positive refractive power having a convex surface on the image side near the optical axis X, and the fourth lens L4 is a lens with negative refractive power having a biconcave shape near the optical axis X. The image-side aspheric surface r8 of the fourth lens L4 has a pole-change point in a position off the optical axis X. All the lenses are made of the same plastic material.

A diffractive optical surface DOE is formed on the object-side surface r3 of the second lens L2.

The basic lens data of Example 11 is shown in Table 11.

TABLE 11

Embodiment 11
Unit mm

| f = | 1.785 |
| --- | --- |
| Fno = | 2.40 |
| ω(°) = | 38.52 |
| IH = | 1.234 |

Surface Data

| Surface No. i | Curvature Radius r | Surface Distance d | Refractive Index Nd | Abbe Number vd |
| --- | --- | --- | --- | --- |
| (Object Surface) | Infinity | Infinity | | |
| (Stop) | Infinity | −0.045 | | |
| 1* | 0.713 | 0.299 | 1.5346 | 56.16 |
| 2* | 1.032 | 0.038 | | |
| 3* | 0.879 | 0.200 | 1.5346 | 56.16 |
| 4* | 1.237 | 0.236 | | |
| 5* | −0.988 | 0.373 | 1.5346 | 56.16 |
| 6* | −0.439 | 0.096 | | |
| 7* | −4.366 | 0.200 | 1.5346 | 56.16 |
| 8* | 0.699 | 0.200 | | |
| 9 | Infinity | 0.210 | 1.5168 | 64.20 |
| 10 | Infinity | 0.298 | | |
| Image Plane | Infinity | | | |

Constituent Lens Data

| Lens | Start Surface | Focal Length |
| --- | --- | --- |
| 1 | 1 | 3.253 |
| 2 | 3 | 3.790 |
| 3 | 5 | 1.196 |
| 4 | 7 | −1.112 |

TABLE 11-continued

Embodiment 11
Unit mm

Aspherical Surface Data

| | 1st Surface | 2nd Surface | 3rd Surface | 4th Surface |
| --- | --- | --- | --- | --- |
| k | −1.696E+00 | 4.613E−01 | −1.843E+00 | 2.824E+00 |
| A4 | 3.753E−01 | −2.038E+00 | −1.144E+00 | 6.833E−01 |
| A6 | −6.937E+00 | −1.605E+01 | −1.556E+01 | −5.716E+00 |
| A8 | 2.109E+00 | 5.863E+01 | −1.533E+01 | −1.057E+01 |
| A10 | −4.799E+01 | 1.024E+01 | 4.550E+02 | 2.419E+02 |
| A12 | 0.000E+00 | 0.000E+00 | 0.000E+00 | −1.186E+02 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
| --- | --- | --- | --- | --- |
| k | −3.964E+00 | −3.673E+00 | 0.000E+00 | −1.155E+01 |
| A4 | −5.528E−01 | −1.484E+00 | −9.833E−01 | −1.166E+00 |
| A6 | −5.576E+00 | 6.006E+00 | 2.555E+00 | 3.037E+00 |
| A8 | 1.000E+02 | −1.603E+01 | −1.576E+00 | −6.433E+00 |
| A10 | −8.489E+02 | 4.533E+01 | −3.287E−01 | 8.743E+00 |
| A12 | 4.153E+03 | 9.358E+01 | −9.166E−01 | −6.862E+00 |
| A14 | −1.198E+04 | −7.318E+02 | 1.780E+00 | 2.840E+00 |
| A16 | 1.264E+04 | 8.822E+02 | −6.910E−01 | −5.435E−01 |

Optical Path Difference Function

| B2 | −2.400E−02 |
| --- | --- |
| B4 | 9.633E−02 |
| B6 | −1.532E+00 |
| B8 | 2.069E+01 |
| B10 | −1.514E+02 |
| B12 | 1.859E+02 |
| B14 | 1.529E+03 |

The values of the conditional expressions are shown below:

$$TLA/(2IH)=0.84 \quad (1)$$

$$TLA/f=1.16 \quad (2)$$

$$f1/f3=2.720 \quad (3)$$

$$vd=56.16 \quad (4)$$

$$vd1=vd2=vd3=vd4 \quad (5)$$

$$(r1+r2)/(r1-r2)=-5.47 \quad (6)$$

$$|f123/f4|=1.01 \quad (7)$$

As shown above, the imaging lens as Example 11 satisfies the conditional expressions (1) to (7). In this example, since the total track length is 2.08 mm, compactness is achieved.

Figure 22:
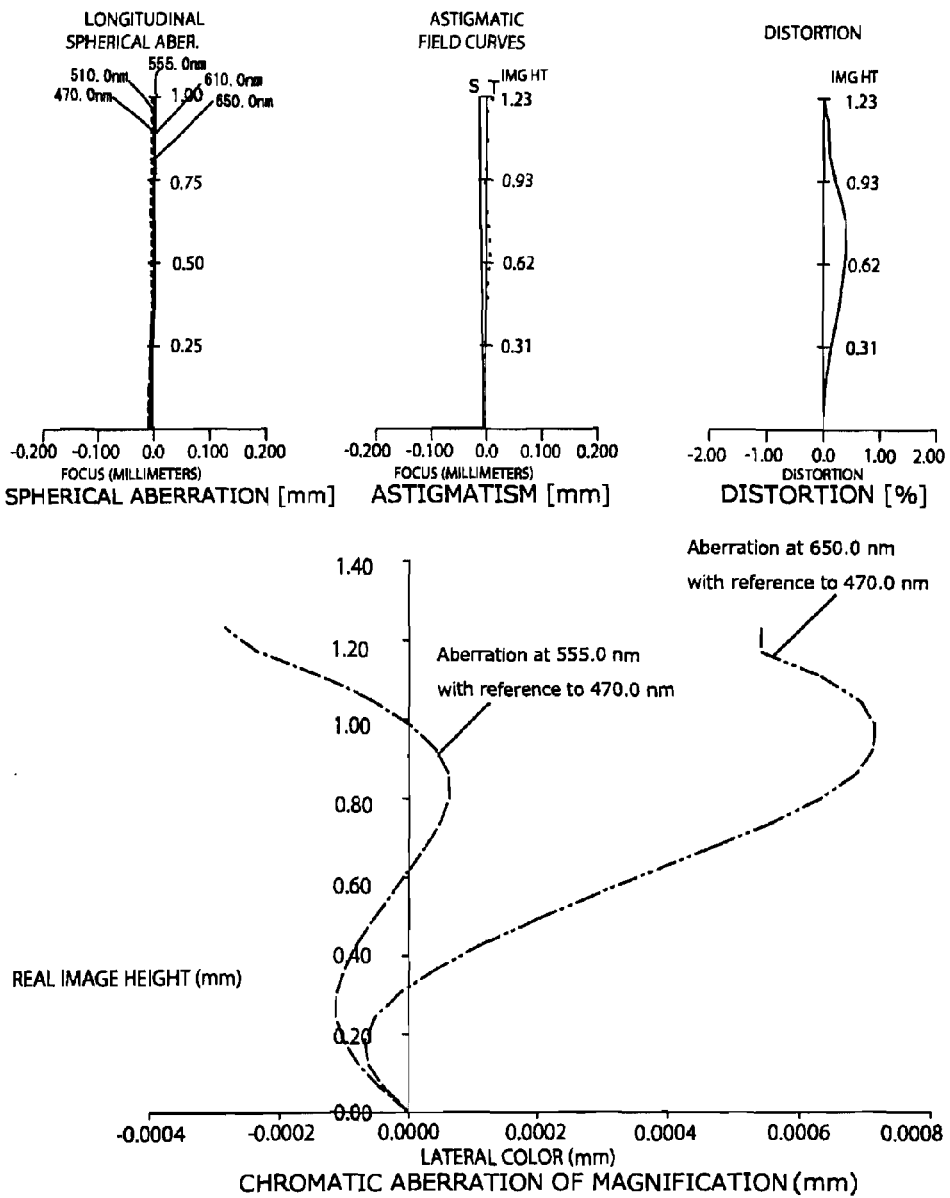
FIG. 22 shows various aberrations of the imaging lens as Example 11 according to the second embodiment of the invention.

FIG. 22 shows spherical aberration (mm), astigmatism (mm), distortion (%), and chromatic aberration of magnification (mm) for the imaging lens as Example 11.

As shown in FIG. 22, the imaging lens as Example 11 corrects various aberrations properly.

The imaging lenses according to the aforementioned embodiments of the present invention provide a wide angle of view with a half view angle range from 32.2 to 38.3 degrees. Also their F-value is relatively small at 2.2 to 2.5, so they are suitable for high-density image sensors whose lens system is required to provide high brightness. In addition, they correct various aberrations properly.

If an imaging lens according to any of the embodiments of the present invention is applied to, for example, a small image sensor of 1/5 inch or less, its total track length can be very small at about 2.0 mm though it includes four constituent lenses. Even if the image sensor size is somewhat larger, the problem of chromatic aberration can be addressed due to the effect of the diffractive optical surface, so a compact imaging lens with a small ratio of total track length to maximum image height can be realized.

If an imaging lens according to each embodiment is applied to the optical system built in the image pickup device of a mobile terminal or mobile phone such as a smart phone or a game machine, the camera concerned can feature both compactness and high performance. Especially, since the distance in the optical axis direction is small in the imaging lens according to the present invention, in the industrial field of mobile device imaging lenses in which the demand for thinness is growing, it is very promising and expected to contribute largely to the industry.

The effects of the present invention are as follows.

According to the present invention, an imaging lens composed of four lenses is provided which is compact (thin) enough and has a small F-value, provides a relatively wide angle of view, and corrects aberrations properly. Also, since all the constituent lenses are made of the same plastic material, the imaging lens is suitable for mass production and can be produced at low cost.

What is claimed is:

1. An imaging lens for a solid-state image sensor in which lenses are arranged in order from an object side to an image side, comprising:
    a first lens with positive refractive power having a convex surface on the object side near an optical axis;
    a second lens having a positive meniscus shape near the optical axis;
    a third lens with positive refractive power having a convex surface on the image side near the optical axis; and
    a fourth lens with negative refractive power having a concave surface on the image side near the optical axis,
    wherein both surfaces of each lens are aspheric;
    wherein the image-side aspheric surface of the fourth lens has a pole-change point in a position off the optical axis; and
    wherein conditional expressions (1) and (2) below are satisfied:

$$0.75 < TLA/(2IH) < 0.90 \qquad (1)$$

$$0.90 < TLA/f < 1.30 \qquad (2)$$

where
    TLA: distance on the optical axis from the object-side surface of the first lens to an image plane of the image sensor when a filter between the fourth lens and the image sensor is removed
    IH: maximum image height
    f: focal length of an overall optical system of the imaging lens.

2. The imaging lens according to claim 1, wherein a conditional expression (3) below is satisfied:

$$0.4 < f1/f3 < 5.5 \qquad (3)$$

where
    f1: focal length of the first lens
    f3: focal length of the third lens.

3. The imaging lens according to claim 1, wherein conditional expressions (4) and (5) below are satisfied:

$$50 \le vd \le 70 \qquad (4)$$

$$vd1 = vd2 = vd3 = vd4 \qquad (5)$$

where
    vd: Abbe number of the first lens to the fourth lens
    vd1: Abbe number of the first lens
    vd2: Abbe number of the second lens
    vd3: Abbe number of the third lens
    vd4: Abbe number of the fourth lens.

4. The imaging lens according to claim 1, wherein a conditional expression (6) below is satisfied:

$$-20.0 < (r1+r2)/(r1-r2) < -0.50 \qquad (6)$$

where
    r1: curvature radius of the object-side surface of the first lens
    r2: curvature radius of the image-side surface of the first lens.

5. The imaging lens according to claim 1, wherein a conditional expression (7) below is satisfied:

$$1.00 < f123/|f4| < 1.20 \qquad (7)$$

where
    f123: composite focal length of the first, second, and third lenses
    f4: focal length of the fourth lens.

6. An image pickup device comprising the imaging lens according to claim 1 and an image sensor of ⅕ inch or less whose number of pixels is 5 megapixels or less.

7. The imaging lens according to claim 1, wherein a diffractive optical surface is provided on at least one of surfaces from the object-side surface of the first lens to the image-side surface of the second lens.

8. The imaging lens according to claim 2, wherein conditional expressions (4) and (5) below are satisfied:

$$50 \le vd \le 70 \qquad (4)$$

$$vd1 = vd2 = vd3 = vd4 \qquad (5)$$

where
    vd: Abbe number of the first lens to the fourth lens
    vd1: Abbe number of the first lens
    vd2: Abbe number of the second lens
    vd3: Abbe number of the third lens
    vd4: Abbe number of the fourth lens.

9. The imaging lens according to claim 2, wherein a conditional expression (6) below is satisfied:

$$-20.0 < (r1+r2)/(r1-r2) < -0.50 \qquad (6)$$

where
    r1: curvature radius of the object-side surface of the first lens
    r2: curvature radius of the image-side surface of the first lens.

10. The imaging lens according to claim 2, wherein a conditional expression (7) below is satisfied:

$$1.00 < f123/|f4| < 1.20 \qquad (7)$$

where
    f123: composite focal length of the first, second, and third lenses
    f4: focal length of the fourth lens.

11. An image pickup device comprising the imaging lens according to claim 2 and an image sensor of ⅕ inch or less whose number of pixels is 5 megapixels or less.

12. The imaging lens according to claim 2, wherein a diffractive optical surface is provided on at least one of surfaces from the object-side surface of the first lens to the image-side surface of the second lens.

* * * * *